(12) United States Patent
Chao et al.

(10) Patent No.: US 12,459,525 B2
(45) Date of Patent: Nov. 4, 2025

(54) SCENE RELIABILITY

(71) Applicant: Zoox, Inc., Foster City, CA (US)

(72) Inventors: Liang Chao, San Francisco, CA (US);
Muhammad Umar Choudry, Seattle, WA (US); Gerardo Cid Fernandez, Oakland, CA (US); Ravi Gogna, San Jose, CA (US); Meredith James Goldman, Redwood City, CA (US); Paul Orecchio, Denver, CO (US)

(73) Assignee: Zoox, Inc., Foster City, CA (US)

( * ) Notice: Subject to any disclaimer, the term of this patent is extended or adjusted under 35 U.S.C. 154(b) by 203 days.

(21) Appl. No.: 18/344,172

(22) Filed: Jun. 29, 2023

(65) Prior Publication Data
US 2025/0002031 A1 Jan. 2, 2025

(51) Int. Cl.
*B60W 50/14* (2020.01)
*G06T 7/20* (2017.01)
(Continued)

(52) U.S. Cl.
CPC ............... *B60W 50/14* (2013.01); *G06T 7/20* (2013.01); *G06T 7/50* (2017.01); *G06T 7/70* (2017.01);
(Continued)

(58) Field of Classification Search
CPC . B60W 50/14; G06T 7/50; G06T 7/70; G06T 17/00; G06T 2207/10016; G06V 20/58
See application file for complete search history.

(56) References Cited

U.S. PATENT DOCUMENTS

2010/0191413 A1* 7/2010 Fritsch ............... G01P 1/122
701/29.2
2015/0293534 A1* 10/2015 Takamatsu ............ B60W 50/08
701/28
(Continued)

FOREIGN PATENT DOCUMENTS

KR 10-2016-0027817 A 3/2016
KR 10-2020-0127218 A 11/2020
KR 10-2023-0086628 A 6/2023

OTHER PUBLICATIONS

International Search Report and Written Opinion dated Sep. 27, 2024 for International Application No. PCT/US2024/033765.

*Primary Examiner* — Terrell M Robinson
(74) *Attorney, Agent, or Firm* — EIP US LLP

(57) ABSTRACT

A computer implemented method is provided. The method, comprises: receiving from an autonomous vehicle sensor data, wherein the sensor data is indicative of an environment in which the vehicle is currently located or was previously located. The method further comprises receiving or determining additional data associated with at least one of: the sensor data, the vehicle, or the environment, wherein the additional data is different from the sensor data. The method further comprises displaying, on a display, an output comprising a representation of the sensor data. The method further comprises determining, based at least in part on the additional data, a reliability metric, the reliability metric being indicative of how reliable the sensor data is at representing the environment in which the vehicle is located at a current time. The method further comprises causing the output on the display to be based at least in part on the reliability metric.

20 Claims, 12 Drawing Sheets

(51) Int. Cl.
*G06T 7/50* (2017.01)
*G06T 7/70* (2017.01)
*G06T 11/20* (2006.01)
*G06T 17/00* (2006.01)
*G06V 20/58* (2022.01)

(52) U.S. Cl.
CPC ............ *G06T 11/206* (2013.01); *G06T 17/00* (2013.01); *G06V 20/58* (2022.01); *B60W 2050/146* (2013.01); *B60W 2554/404* (2020.02); *B60W 2554/80* (2020.02); *B60W 2556/45* (2020.02); *B60W 2756/10* (2020.02); *G06T 2207/10016* (2013.01); *G06T 2207/30241* (2013.01); *G06T 2207/30252* (2013.01)

(56) References Cited

U.S. PATENT DOCUMENTS

| | | | |
|---|---|---|---|
| 2019/0227545 A1 | 7/2019 | Yoo et al. | |
| 2020/0180650 A1 | 6/2020 | Lee et al. | |
| 2020/0191914 A1* | 6/2020 | Kunz | G01S 7/4802 |
| 2020/0293034 A1* | 9/2020 | Shibata | G01M 17/007 |
| 2021/0297633 A1* | 9/2021 | Motoyama | G05D 1/02 |
| 2021/0378227 A1* | 12/2021 | Crinklaw | A01B 69/008 |

* cited by examiner

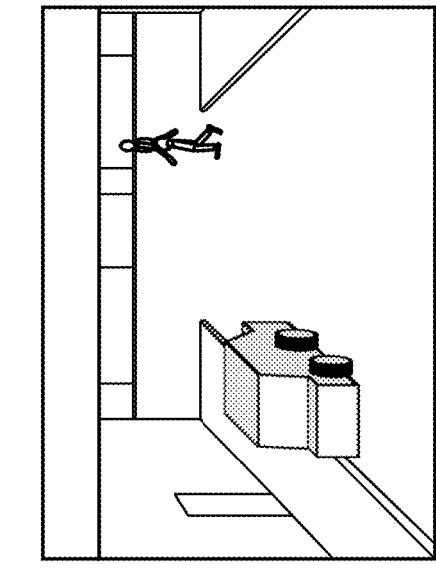
FIG. 4A
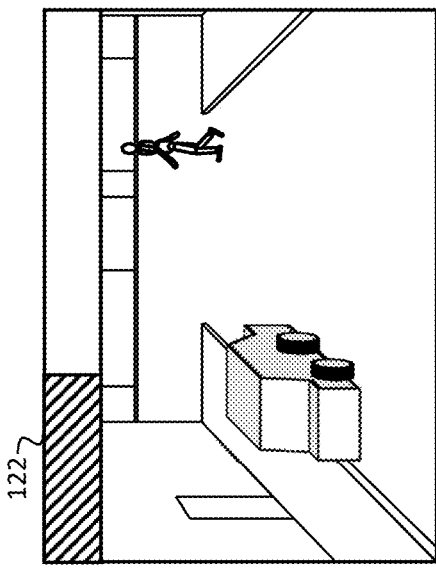
FIG. 4B
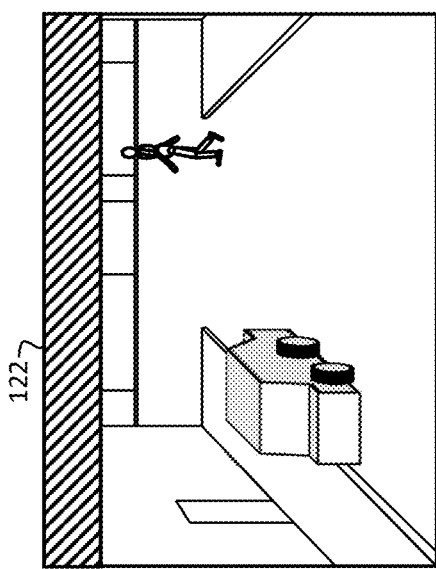
FIG. 4C
FIG. 5A
FIG. 5B
FIG. 5C

SCENE RELIABILITY

BACKGROUND

Autonomous and partially autonomous vehicles are increasingly being tested and used not only for convenience, but also to improve road safety. Autonomous vehicles may have a combination of different sensors that can be used to detect nearby objects to help the vehicle navigate through the environment.

BRIEF DESCRIPTION OF DRAWINGS

The detailed description is described with reference to the accompanying figures. The use of the same reference numbers in different figures indicates similar or identical components or features.

FIGS. 4A-12 are pictorial diagrams of further examples of outputs on a display at the remote system;

DETAILED DESCRIPTION

Figure 1:
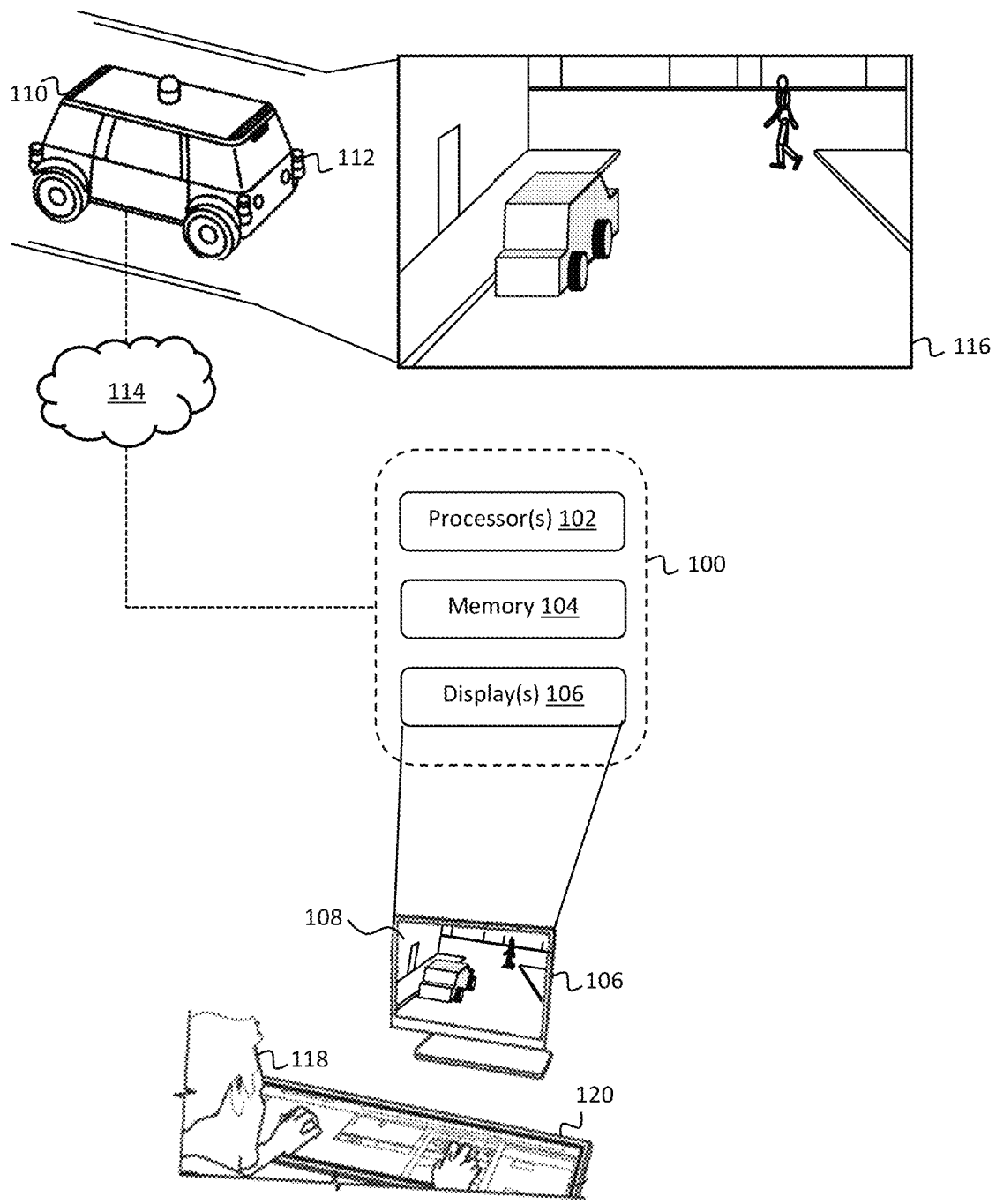
FIG. 1 is a pictorial diagram of system, including a vehicle and remote system for monitoring the vehicle, according to an example.

This application relates to systems, methods and computer-readable media for determining how reliable sensor data, such as video data, is for representing the current location of an autonomous vehicle, where the sensor data has been recorded by the vehicle at an earlier time. Once the reliability of the sensor/video data has been determined, a visual output of the sensor data can be adapted depending upon the reliability. For example, a vehicle may send video data to a remote system so that it can be displayed to a human operator for monitoring purposes or in case the operator needs to provide instructions to help navigate the vehicle through the environment. In addition to this display, adapting the display based on the reliability of the sensor/video data can inform the operator whether the sensor/video data can be used as a reliable reference or if should be used with caution or disregarded, thereby improving awareness of the operator and resulting in improved safety.

In locations with good connectivity (such as good cellular connectivity), video or other sensor data may be streamed from the vehicle, to the remote system, in real or near-real time. Under such connectivity conditions, where the video data is sent from the vehicle and displayed at the remote system in a short time, the video data may be considered reliable at representing the current environment around the vehicle. However, when connectivity is poor, the transmission of the video data may be restricted, meaning that subsequent frames of the video data may not be sent by the vehicle and/or may not be received at the remote system. In this situation the remote system may not receive updated video data for some time. A previous video frame may therefore be displayed to a human operator, despite this being considered "old" or outdated. As such, the last frame of video frame data received by the system may no longer accurately represent the current environment around the vehicle. For example, the vehicle may have moved from the location represented in the video data, or one or more objects (such as other vehicles or pedestrians) may have moved relative to the vehicle. As a result, it is desirable to indicate to the operator that the video data may be less reliable or unreliable.

The present disclosure therefore relates to determining a reliability metric associated with the sensor/video data (such as a value, numerical value, or some other indicator), where the reliability metric is indicative of how reliable sensor/video data is at representing the current environment around the vehicle. For example, if the latest video frame received by the remote system was recorded only a short time ago, such as less than 2 seconds ago, it may be classified as more reliable (such as having a higher reliability metric) than if the video frame data was recorded 10 seconds ago. As another example, if the vehicle is stationary or has moved only a short distance since video frame data stopped being sent to the remote system, the video frame data may be classified as more reliable than if the vehicle had moved a large distance. As a further example, if the vehicle is in a remote area with few cars and pedestrians, the video frame data may be determined as more reliable than if the vehicle was located in a busy city because the environment around the vehicle is less likely to change, or change to a lesser degree when there are fewer moving objects.

In some examples, the reliability of the video frame data can be determined based on two or more parameters, such as two or more of the following parameters: (i) a time difference between when the video frame data was recorded and when the video frame data was received by the remote system, (ii) a distance travelled by the vehicle, (iii) a speed of the vehicle, (iv) a location/area of the vehicle, (v) a time of day, (vi) a number of nearby non-stationary objects and/or (vii) distances to non-stationary objects.

As mentioned, once the reliability of the sensor/video data has been determined, a display/monitor that is viewable by the operator can be updated based on the reliability metric. For example, if the reliability metric indicates that the video frame data is less reliable, the display may be updated to highlight this to the operator by displaying a graphical item on top of, next to or near to the video being displayed. The graphical item can visually indicate to an operator the reliability of the video data. For example, presence of a coloured bar along the top of the video may indicate that the video data is less reliable compared to instances where there the bar is absent, smaller, less noticeable (such as a higher transparency), or coloured differently. In another example, if the video frame data is considered unreliable, the video may cease to be displayed, or dimmed in brightness.

In examples described herein, there is provided a system comprising: (A) one or more processors, and (B) one or more non-transitory computer readable media having instructions stored thereon which, when executed by the one or more processors, cause the one or more processors to perform operations comprising: (i) receiving, at the system, from an autonomous vehicle, video data comprising video frame data, wherein the video frame data is indicative of an environment in which the vehicle is currently located or was previously located, (ii) causing a display to output a representation of the video frame data, (iii) receiving or determining, at the system, additional data associated with at least one of: the video frame data, the vehicle or the environment, (iv) determining, based at least in part on the additional data, a reliability metric, the reliability metric being indicative of how reliable the video frame data is at representing an environment in which the vehicle is located at a current time, and (v) causing the output on the display to be based at least in part on the reliability metric.

The system may be a remote system, such as a remote system used by a human operator to monitor and/or interact with the vehicle. The system may be communicatively coupled to the vehicle such as via one or more wired and/or wireless networks. In examples, the one or more processors cause the system to provide command data to the vehicle, where the command data comprises an instruction for the vehicle (such as a navigation instruction). In examples, the system may also provide an indication of the reliability metric to the vehicle (as part of the command data, for example) and/or the vehicle may itself determine a reliability of a network connection between the vehicle and the system. For example, the vehicle may infer that some data may not be being received by the system or being sent to the system based on the reliability of the network connection. For example, the vehicle may determine that the network connection is unstable or slow. Based on the reliability metric provided by the system and/or the reliability of the network connection determined by the vehicle, the vehicle can carry out/implement the instruction. For example, if the reliability metric indicates that the video frame data is unreliable or the reliability of the network connection indicates that some or all of the data may not be being received by the system, the vehicle may be more cautious about implementing the instruction compared to when the reliability metric indicates that the video frame data is more reliable or when the network connection is more reliable, because the operator is basing their instruction on unreliable data. Instructions provided by the operator and being processed by the vehicle may then be given a lower weighting by the vehicle (and therefore be less likely to be acted upon by the vehicle) if the reliability metric indicates that the video frame data is unreliable or the reliability of the network connection indicates that the network connection is unreliable, compared to cases when the reliability metric or network connection is more reliable. To determine the reliability of the network connection, the vehicle may monitor "keepalive" or "heartbeat" signals received from the vehicle, and determine the reliability of the network connection based on whether such signals are being received, such as at an expected rate.

The vehicle may interact with a teleoperator station as described in US patent application US 2022/0194419 A1 which is hereby incorporated by reference in its entirety and for all purposes. As described above, the vehicle may determine to perform an action (using its onboard autonomous driving components) using a command from a teleoperator as guidance. The vehicle may use the command from the teleoperator as an input but may also evaluate its current environment to determine its final action to perform. As disclosed herein, the commands sent by the operator can have attached a reliability metric which may be determine by a remote computer (e.g., teleoperator) station and/or onboard the vehicle (e.g., using network connection reliability information). When receiving a command from a teleoperator, the vehicle may determine which action to take by taking reliability metric attached to the command into account. For example, the vehicle may be more cautious in implementing a command from a teleoperator if the reliability metric indicates that the command was determined using unreliable data (e.g., stale data).

The example system can receive video data from the vehicle and output video on a display so that it can be viewed by an operator. Outputting the video on a display may comprise generating an output for display, in some examples. In addition, the system may receive from the vehicle (or another source), additional data associated with at least one of: the video frame data, the vehicle or the environment. This additional data can be used to determine the reliability metric. For example, data associated with the video frame data may allow a time difference associated with the video frame data to be determined by the system, where the time difference represents the "age" of the video. For example, the data associated with the video frame data may include one or more timestamps to allow the time difference to be determined. The time difference may be, or may be based on, a time difference between a time at which the video frame data was recorded by the vehicle and the current time, among other possibilities. Data associated with the vehicle may include a speed of the vehicle and/or a distance travelled by the vehicle and/or a condition of one or more sensors (such as the sensor(s) used to capture/measure the video frame data or sensor data) for example. Data associated with the environment may include a number of non-stationary objects in the environment and/or a distance between the vehicle and one or more non-stationary objects in the environment and/or or a characteristic and/or state of one or more objects in the environment. The number of, and/or distance to, the non-stationary objects may be determined by the vehicle or system. The characteristic and/or state may also be determined by the vehicle or system. Any or all of these parameters may be used to calculate a reliability metric.

For example, a relatively large time difference may result in (or contribute to) a lower reliability metric (meaning less reliable) and a relatively small time difference may result in (or contribute to) a higher reliability metric (meaning more reliable). Similarly, a relatively high speed may result in (or contribute to) a lower reliability metric (meaning less reliable) and a relatively low speed may result in (or contribute to) a higher reliability metric (meaning more reliable). Similarly, a relatively high distance travelled by the vehicle may result in (or contribute to) a lower reliability metric (meaning less reliable) and a relatively low distance may result in (or contribute to) a higher reliability metric (meaning more reliable). Similarly, a better condition/state of one or more sensors may result in (or contribute to) a higher reliability metric (meaning more reliable) and a poorer condition/state may result in (or contribute to) a lower reliability metric (meaning less reliable). A good or better condition sensor may be one that is collecting data correctly, and is free from faults or errors, and/or has been calibrated correctly, and/or is clean and free from dirt and debris. A worse or poor condition sensor may be one that is not collecting data correctly, and may have one or more faults or errors, and/or has not been calibrated or has not been calibrated for a certain time, and/or is dirty. Similarly, a relatively high number of non-stationary objects may result in (or contribute to) a lower reliability metric (meaning less reliable) and a relatively low number may result in (or contribute to) a higher reliability metric (meaning more reliable). Similarly, a relatively low distance to one or more non-stationary objects may result in (or contribute to) a lower reliability metric (meaning less reliable, since closer objects are more relevant and likely to interact with the vehicle) and a relatively high distance may result in (or contribute to) a higher reliability metric (meaning more reliable). Each parameter used to calculate the reliability metric may be weighted, such that each parameter contributes to the reliability metric. Similarly, the characteristic and/or state of each object results in, or contributes to, a higher or lower reliability metric based on the object.

In examples, the reliability metric may be a numeric value within a scale of numeric values (such as a value in a scale of 0 to 1), where a higher reliability metric (such as a value of 1 or 0.9) indicates that the sensor/video data is more reliable than a lower reliability metric (such as a value of 0 or 0.1). The reliability metric may therefore take one of a plurality of values within the scale of numeric values, the scale being defined between a minimum reliability metric (such as 0) and a maximum reliability metric (such as 1), where the maximum reliability metric indicates that the video frame data is more reliable at representing the environment in which the vehicle is located at the current time than the minimum reliability metric.

In examples, the reliability metric may be a colour, such as red or green, where red may indicate that the video is less reliable than green, or the reliability metric may be a word or phrase, such as "Reliable" or "Not Reliable" or "Less Reliable". In some examples, the reliability metric may be binary, rather than having three or more values/indications. In examples, the reliability metric may be displayed as a level of opacity wherein more opaque features may be more reliable and, optionally, wherein features deemed to be too unreliable are no longer displayed. These features may be used in any combination.

In examples, the reliability metric may be determined based on a time difference and other additional data, such as the speed of the vehicle, distance travelled, etc. Using the time difference, in addition to other additional data, may provide a more complete representation of the reliability of the video data than when the reliability metric is based on only one parameter. In some cases, the time difference may be the most useful indicator of reliability, when compared to other additional data, such as the speed, distance, etc.

As an example, if the video data was recorded by the vehicle 1 second ago (i.e., the "time difference" is 1 second), and the vehicle was moving at 15 m/s, the video data may be considered to be relatively reliable. The calculated/determined reliability metric may be 0.9 for example. In contrast, if the video data was recorded by the vehicle 10 seconds ago, and the vehicle is moving at 10 m/s, the video data may be considered to be less reliable. The reliability metric may be 0.2 for example. In another case, if the video data was recorded by the vehicle 1 second ago, and the vehicle is moving at 30 m/s, the video data may be considered to be less reliable than when the vehicle was moving at 15 m/s, despite the time difference being the same. As such, various parameters may contribute to the reliability metric, including for example, the time difference.

In examples described herein, there is provided a system comprising: (A) one or more processors, and (B) one or more non-transitory computer readable media having instructions stored thereon which, when executed by the one or more processors, cause the one or more processors to perform operations comprising: (i) receiving, at the system, from an autonomous vehicle, video data comprising video frame data, wherein the video frame data is indicative of an environment in which the vehicle is currently located or was previously located, (ii) causing a display to output a representation of the video frame data, (iii) receiving or determining, at the system, additional data associated with at least one of: the vehicle or the environment, (iv) determining a time difference associated with the video frame data, (v) determining, based at least in part on the additional data and the time difference associated with the video frame data, a reliability metric, the reliability metric being indicative of how reliable the video frame data is at representing an environment in which the vehicle is located at a current time, and (vi) causing the output on the display to be based at least in part on the reliability metric.

Video frame data may include data corresponding to a single frame of a recorded video. Video frame data may include data corresponding to pixels within the single frame. In some examples, video data comprises first video frame data and second video frame data, where the first video frame data corresponds to a first frame of recorded video and the second video frame data corresponds to a second frame of recorded video. The first and second frames may be frames recorded at different times by the same video camera or may be frames recorded by different video cameras at the same time, or substantially the same time, or may be frames recorded by different video cameras at different times. To generate the video frames the vehicle may comprise two or more video cameras.

It will be appreciated that throughout this disclosure, any reference to "video data" or "video frame data" may be replaced by "sensor data" where the sensor data is recorded by the vehicle. Sensor data may include video data for example, or may include other sensor data that can be visually displayed to represent the environment around the vehicle, such as lidar data. Accordingly, any representation of sensor data, such as video data, on a display, can be associated with a reliability metric. In examples, two or more representations of sensor data may be displayed (either at the same time, or at different times) and each representation may be associated with the same, or different reliability metrics. For example, a first representation of sensor data may be associated with a first reliability metric, and a second representation of sensor data may be associated with a second reliability metric. Each reliability metric may be determined in the same way as described throughout this disclosure. In examples, the first representation of sensor data may be a representation of video frame data and the second representation of sensor data may be a representation of other sensor data, such as lidar data. The second representation of sensor data may be a model of the environment, where the model is based on the sensor data. The model may be a 2D or 3D model, for example. The model may be known as a 3D representation of the environment.

It will be appreciated that throughout this disclosure, a "time difference" may be determined in many different ways. For example, the time difference may be based on one of: (i) a time difference between a time at which the video frame data was recorded by the vehicle and the current time, (ii) a time difference between a time at which the video frame data was sent by the vehicle and the current time, (iii) a time difference between a time at which the video frame data was received by the system and the current time, or (iv) a time difference between a time at which the representation of the video frame data was output by the display and the current time, among other possibilities. Regardless of how the time difference is represented, in each case, the time differences are proportional to (i.e., associated with) a time at which the video frame data was recorded by the vehicle and the current time, even if the time difference is actually taken to be between two different points in time.

As briefly mentioned, the system may receive or determine additional data associated with at least one of: the video data, the vehicle or the environment. As an example, the vehicle can transmit to the system its current speed, a distance travelled in a particular time period, the local time, a location of the vehicle, classification(s) or type(s) of one or more objects in the environment, state(s) of one or more objects in the environment, a number of non-stationary objects in the environment, distance(s) between the vehicle and one or more non-stationary objects in the environment, condition(s) of one or more sensors of the vehicle, etc. Alternatively, raw data may be transmitted to the system, to allow the system to determine such parameters itself. For example, along with the video frame data, the video data may include a timestamp, such as a timestamp associated with when the video frame data was recorded, saved or transmitted to the system. Using this timestamp, the system can determine a time difference. For example, the system can determine or otherwise obtain a timestamp associated with the current time (or a time at which the video frame data was received from the vehicle or displayed by the system), and determine the time difference based on both timestamps. Accordingly, the system may determine a time difference associated with the video frame data.

In other cases, the additional data may be retrieved from a source other than the vehicle. Based on the current location of the vehicle (and in some cases also the local time), historical data associated with that location/environment (and local time) may be obtained (such as whether the location is typically associated with many pedestrians or whether there are likely to be many pedestrians in the location at that particular time of day/night). This historical data can also be used to determine how reliable video data may be.

In examples, causing a display to output a representation of the video frame data may include displaying the video frame on a display for viewing by the operator. Other video frames may be displayed at the same time. For example, if the vehicle has multiple cameras with different fields of view, two or more video frames from different cameras may be displayed at the same time. Each displayed video frame may be associated with a separate reliability metric or all of the displayed video frames may be associated with the same reliability metric. In some examples, causing a display to output a representation of the video frame data may comprise generating an output including a representation of the video frame data and causing the display to display the generated output.

In examples, causing the output on the display to be based at least in part on the reliability metric may include initially outputting on the display the representation of the video frame data and later updating or adjusting the output based on a reliability metric being determined for the video frame data, such as ceasing to display the representation of the video frame data and/or causing the display to output a graphical item, wherein the graphical item is based on the reliability metric. For example, the display may be updated if and when the reliability metric associated with the video frame data is determined and/or changes over time. In another example however, causing the output on the display to be based at least in part on the reliability metric may include outputting on the display the representation of the video frame data and at the same time, or substantially the same time, causing the display to output a graphical item, wherein the graphical item is based on the reliability metric. Accordingly, in some examples, causing the output on the display to be based at least in part on the reliability metric may comprise causing the output on the display to be generated based at least in part on the reliability metric. In some examples, causing the output on the display to be based at least in part on the reliability metric may comprise generating the output based at least in part on the reliability metric and causing the display to display the generated output. In some cases, the generated output may no longer include the representation of the video frame data depending upon the reliability metric. In some cases, the generated output may include a graphical item that is based on the reliability metric in addition to, or instead of the representation of the video frame data.

References throughout the following disclosure to an "output" visible on a display will be understood to mean that the output has been generated and subsequently caused to be displayed.

As mentioned above, the video frame data is indicative of an environment in which the vehicle is currently located or was previously located. This means that the video frame data may correspond to a measurement or "snapshot" of the environment or a particular view of the environment at a particular point in time, where the point in time is earlier than the "current time".

More detailed examples of the system, as well as method(s) and computer-readable media of the present disclosure will now be presented, with reference to the accompanying figures.

FIG. 1 depicts an example implementation of the present disclosure. As shown, an autonomous vehicle 110 is located within an environment. In this example, the vehicle 110 is navigating throughout the environment at a particular speed, but in other examples, the vehicle 110 may be stationary. The vehicle comprises one or more sensors 112, in this case a video camera 112, that captures images/frames of the environment and stores (at least temporarily) the recorded frames as video data.

FIG. 1 depicts a view 116 of the environment as seen by a sensor, such as the video camera 112. For example, within the field of view 116 there may be one or more moving (i.e., non-stationary) objects, such as one or more pedestrians, vehicles or cyclists, as well as one or more stationary objects, such as one or more parked or stopped vehicles, buildings, signs, etc.

A remote system 100 may be communicatively coupled to the vehicle 110 via one or more networks 114. Sensor data (such as video data comprising video frame data) captured by the one or more sensors 112, can be transmitted to the remote system 100 via the network 114. The one or more sensors 112 can capture data at a particular rate, such as a particular frame rate. Some or all of the data captured by the one or more sensors 112 can be transmitted to the remote system 100. The sensor data sent by the vehicle may have been processed by the vehicle or may be raw data captured by the one or more sensors 112.

Accordingly, the vehicle 110 may comprise a communication connection to enable data to be transmitted to the remote system 100. In this example, the communication connection comprises a wireless antenna for sending the sensor data (and any additional data) to the remote system 100.

In examples, the vehicle 110 transmits video data comprising video frame data to the remote system 110, although it will be appreciated the following discussion can apply equally to sensor data in general. The video frame data is indicative of the field of view 116 within the environment at the time the video frame data was captured.

In addition to the video data, additional data captured by or otherwise generated by the vehicle 110 may also be sent to the remote system 100 via the network 114. The additional data may be associated with at least one of the video frame data, the vehicle or the environment.

For example, data associated with the video frame data may include a timestamp associated with the video frame data. Data associated with the vehicle may be indicative of at least one of: a current or average speed of the vehicle, a distance travelled by the vehicle in a particular time period, a local time of the vehicle, or a location of the vehicle. Data associated with the environment may include sensor data, or additional sensor data, such as sensor data from a different sensor 112 (such as a lidar or radar device). In some cases, the same sensor data used to generate the output on the display (i.e., the representation of the sensor data) may also be used to determine the reliability metric, so the sensor data used to generate the output is not necessarily different to the additional data used to determine the reliability metric, for example. In other cases, the sensor data used to generate the output on the display is different to the additional data used to determine the reliability metric. The data associated with the environment may be indicative of a number of non-stationary objects in the environment or a distance between the vehicle and one or more non-stationary objects in the environment or classification(s) or type(s) of one or more objects in the environment or state(s) of one or more objects in the environment. A classification or type of an object may include, for example, "traffic signal", "road intersection", "vehicle", "pedestrian", "cyclist", etc., and a state of an object may include more detail as to a current property, condition or behavior of an object. For example, a state of a vehicle may include "headlights on/off", "travelling towards autonomous vehicle in opposite lane", etc. A state of any object may include a speed of the object, a position, such as a position on the road, a direction of movement, etc. A state of a road intersection may be, for example, "busy" or "quiet". A state of a traffic signal may be, for example, "green light", "red light". Based on the classification and/or state of the object(s), the video frame data (or more generally sensor data) that is output as part of the representation on the display, may be considered more or less reliable. The classification and/or state may therefore be used to determine the reliability metric. For example, if a traffic signal is detected, the video frame data or sensor data may be considered less reliable than if there are no traffic signals present, because the operator cannot be certain whether the traffic signal indicates that the autonomous vehicle should stop or go. As another example, if a vehicle has its headlights off, yet it is nighttime, it may be assumed that the vehicle is stationary, so the video frame data or sensor data may be considered more reliable because it is unlikely the vehicle will have moved from the position shown in the displayed representation. Similarly, a busy intersection may mean that the video frame data or sensor data is less reliable, because the scene/environment will be changing rapidly. A cyclist in the road may, for example, be treated as more unpredictable than a pedestrian on the sidewalk or a vehicle, meaning that a cyclist in the vicinity of the vehicle may result in a lower reliability metric than if the cyclist was not present, or was instead a vehicle. Similarly, a faster moving object may result in a lower reliability metric, and a vehicle in the opposite lane may result in a higher reliability metric than if the vehicle was in the same lane, since the autonomous vehicle and the vehicle in the opposite lane are less likely to interact than if they were in the same lane.

The system 100 comprises one or more processors 102 and one or more non-transitory computer readable media 104 having instructions stored thereon which, when executed by the one or more processors 102, cause the one or more processors 102 to perform particular operations, which will be discussed in more detail below.

The system 100 may further comprise a display 106 (also known as a computer monitor) for displaying information to an operator 118. The system 100 may further comprise one or more input devices 120 to receive user input from the operator 118. For example, the user input may cause an instruction to be transmitted to the vehicle 110 via the network 114 which causes the vehicle 110 to perform an action, such as follow a particular path through the environment.

The information output on the display 106 can include a representation 108 of the sensor data, such as the video frame data. FIG. 1 depicts the display 106 outputting a representation 108 of the video frame data received from the vehicle 110, where the output for display has been generated by the system, such as the processor(s) 102. The display 106 therefore outputs a representation 108 of the view 116 of the environment as seen by the video camera 112. As will be discussed in more detail below, if the vehicle 110 comprises two or more video cameras 112 and video frame data from the two or more video cameras 112 is transmitted to the system 100, the display 106 may output video frame data from the two or more video cameras 112. For example, two or more representations of the video frame data may be simultaneously output on the display 106, or the display 106 may output the representations at different times (and an operator may select between the two or more representations of the video frame data as required).

In addition to the display of the video frame data, the system 100 is configured to determine a reliability metric indicative of how reliable the video frame data is at representing an environment in which the vehicle 110 is currently located. For example, after the video frame data was recorded by the vehicle 110, the vehicle 110 may have moved to a different location and/or one or more non-stationary objects may have moved relative to the vehicle 110. The "environment" around the vehicle may have therefore changed and be different to the environment represented in the video frame data. In another example, the vehicle 110 may not have moved since the video frame data was recorded and one or more non-stationary objects may have moved relative to the vehicle 110. Again, the "environment" around the vehicle may have therefore changed and be different to the environment represented in the video frame data. In another example, the vehicle 110 may not have moved since the video frame data was recorded and one or more non-stationary objects may not have moved relative to the vehicle 110 (or there may be no non-stationary objects). In that case, the "environment" around the vehicle may not have changed compared to the environment represented in the video frame data.

The operator 118 is therefore viewing a representation of video frame data that was recorded at an earlier moment in time, where that moment in time may have been relatively recent (such as a less than a few seconds ago) or may have been further in the past (for example, there may have been a delay in receiving the video frame data, or subsequent video frame data may not have been sent by the vehicle 110 or received by the remote system 100, so the same video frame data may be displayed top the operator 118 for a longer period). Depending upon the extent to which the environment around the vehicle 110 has changed, the video frame data may be considered reliable or less reliable at accurately representing to actual environment around the vehicle 110.

As previously mentioned, the reliability metric can be determined based on additional data received from the vehicle and/or additional data determined by the system.

As will be discussed below in relation to several examples, the reliability metric may correspond to a value within a scale, and may take a value between 0 and 1, for example, where a higher value means the video data is more reliable at representing the current environment than a lower value.

Once the reliability metric associated with the video frame data has been determined, the output on the display 106 can be generated based on the reliability metric. For example, as previously mentioned, the output on the display 106 may include a graphical item, wherein the graphical item is based on the reliability metric. The graphical item may be displayed over, near to, or next to the representation 108 of the video frame data so as to inform the operator 118 as to the reliability of the displayed representation 108 of the video frame data. In some cases, the reliability metric may be such that in addition to, or instead of displaying a graphical item, the representation 108 of the video frame data may cease to be output or be dimmed, again to inform the operator 118 that the video frame data is unreliable.

In some cases, further reliability metrics may be determined for the same video frame data, and the output on the display 106 may be modified based on a further reliability metric associated with the video frame data (where modifying the output may comprise generating an updated output on the display 106). For example, if no further frames of video data are received (at least in the short term), then the video frame data may become less reliable over time as the environment around the vehicle 110 changes. Video frame data may therefore be initially considered reliable (and the output on the display 106 may indicate this), but may become less reliable if updated video frame data is not received for some time.

Examples of Determining Reliability Metric

Example 1

As mentioned, in some examples, along with the video frame data, the vehicle 110 also transmits to the system 100 additional data, which is then used by the system 100 to determine the reliability metric. In a first example, the vehicle 110 transmits to the system 100 additional data associated with the video frame data, where the additional data associated with the video frame data comprises a timestamp. The timestamp is therefore associated with the video frame data. In one case, the timestamp corresponds to a time at which the video frame data was captured by the vehicle 110, although it will be appreciated that the timestamp may correspond to another time, such as when the video frame data was saved, processed or sent by the vehicle, among other possibilities.

In another example, the vehicle 110 itself determines additional data associated with the video frame data, where the additional data associated with the video frame data comprises a timestamp. In one case, the timestamp corresponds to a time at which the video frame data was received by the system 100, although it will be appreciated that the timestamp may correspond to another time, such as when the video frame data was saved or processed by the system 100, among other possibilities.

Based on the timestamp, the system 110 can determine a time difference associated with the video frame data. For example, the time difference may be determined based on the time difference between the timestamp and the current time.

Once the time difference has been determined, the system may determine a reliability metric associated with the video frame data. In examples, the time difference itself is used as a reliability metric. In examples, the time difference may be compared to a threshold time difference. For example, if the time difference is less than a threshold, such as 2 seconds, the reliability metric may correspond to a first reliability metric, and if the time difference is greater than the threshold, the reliability metric may correspond to a second reliability metric, where the first and second reliability metrics are different. In examples, the first reliability metric may be higher than the second reliability metric, wherein a higher reliability metric indicates that the video frame data is more reliable at representing the environment in which the vehicle is located at the current time than a lower reliability metric. It will be appreciated that "higher" and "lower" reliability metrics do not necessarily mean a higher or lower numerical value, but rather the reliability metric is indicative of a higher or lower reliability.

In another example, the time difference may be compared to two or more threshold time differences. For example, if the time difference is less than a first threshold, such as 2 seconds, the reliability metric may correspond to a first reliability metric, and if the time difference is greater than the first threshold and less than a second threshold, such as 4 seconds, the reliability metric may correspond to a second reliability metric, and if the time difference is greater than the second threshold the reliability metric may correspond to a third reliability metric, where the first, second and third reliability metrics are different. The first reliability metric may be higher than the second reliability metric and the second reliability metric may be higher than the second reliability metric.

In examples, the first reliability metric corresponds to a value of 1, the second reliability metric corresponds to a value of 0.5 and the third reliability metric corresponds to a value of 0.1 and the first threshold time difference is 2 seconds, and the second threshold time difference is 4 seconds. In such a case, if the time difference is 3 seconds, the reliability metric may be determined to be 0.5. As another example, the time difference may be 6 seconds, so the reliability metric may be determined to be 0.1. In this example, a higher value for the reliability metric (such as 0.5) means that the video frame data is more reliable than a lower value for the reliability metric (such as 0.1). It therefore follows that a greater time difference results in (or at least contributes to) a lower reliability metric.

Example 2

In a second example, the vehicle 110 transmits to the system 100 (or the system 100 itself determines) additional data associated with the video frame data, where the additional data associated with the video frame data comprises a timestamp. In addition, the system 100 receives or determines additional data associated with the vehicle, such as a speed of the vehicle and/or a distance travelled by the vehicle in a particular time period (such as the distance travelled since the last video frame data was transmitted to the system). For example, the vehicle 110 may transmit its speed or distance travelled, or the necessary data to enable the speed or distance to be determined by the system 100. As previously discussed, the system 110 can determine a time difference associated with the video frame data based on the timestamp.

Once the time difference has been determined, the system may determine a reliability metric associated with the video frame data based on the time difference as well as the speed and/or the distance. Each of these parameters (that is, the time difference and speed/distance) may be associated with a particular weighting, and therefore contribute to the overall reliability metric. For example, the reliability metric, M, may be based on two or more sub-metrics, m, where each sub-metric is determined based on a separate parameter and is weighted based on the parameter. For example, the time difference may be used to determine a first sub-metric and the speed or distance may be used to determine to a second sub-metric.

More generally, the reliability metric M, may be represented by: $M=\Sigma_{i=1}^{n} w_i m_i$, where n corresponds to the number of parameters (in this case two), and w corresponds to the weighting of each sub-metric.

In examples, the time difference may be considered the most important parameter for determining the reliability of the video frame data, and so may have a greater weighting than the weighting of the other parameters (such as speed or distance). For example, the weighting associated with the time difference may be 0.6, whereas the weighting associated with the speed or distance may be 0.4.

Each sub-metric may be determined separately for each parameter, in the same way as discussed for the reliability metric in the first example. In some cases, sub-metrics may be determined by comparing the parameter to one or more thresholds.

For the time difference, the sub-metric may take one of a plurality of values as above. For example, depending upon the time difference (and any associated thresholds), the sub-metric may correspond to a first sub-metric having a value of 1, a second sub-metric having a value of 0.5 or a third sub-metric having a value of 0. Similarly, for speed or distance, the sub-metric may also take one of a plurality of values.

Once each sub-metric has been determined for each parameter, the overall reliability metric can be determined based on the sub-metrics and weights associated with each parameter.

As an example, the time difference may be 1 second, so the sub-metric for the time difference may be determined to be 1, and the speed of the vehicle may be 5 meters per second, so the sub-metric for speed may be determined to be 0.8. Based on the example weights mentioned above, $M=0.6 \times 1 + 0.4 \times 0.8 = 0.92$. As another example, the time difference may be 6 seconds, so the sub-metric for the time difference may be determined to be 0.1, and the speed of the vehicle may be 15 meters per second, so the sub-metric for speed may be determined to be 0.2. Based on the example weights mentioned above, $M=0.6 \times 0.1 + 0.4 \times 0.2 = 0.14$. As a further example, the time difference may be 6 seconds, so the sub-metric for the time difference may be determined to be 0.1, and the speed of the vehicle may be 0 meters per second, so the sub-metric for speed may be determined to be 1. Based on the example weights mentioned above, $M=0.6 \times 0.1 + 0.4 \times 1 = 0.46$. It therefore follows that a greater speed contributes to a lower reliability metric. Similarly, although not shown here, a greater distance contributes to a lower reliability metric.

Example 3

In a third example, the vehicle 110 transmits to the system 100 (or the system 100 itself determines) additional data associated with the video frame data, where the additional data associated with the video frame data comprises a timestamp. In addition, the system 100 receives or determines additional data associated with the vehicle, such as a distance travelled by the vehicle in a particular time period (such as the distance travelled since the last video frame data was transmitted to the system). Further still, the system 100 also receives or determines additional data associated with the environment, which includes the number of non-stationary objects in the environment. The number of non-stationary objects may be determined from video data, or other sensor data, such as lidar data, for example.

As previously discussed, the system 110 can determine a time difference associated with the video frame data based on the timestamp.

Once the time difference has been determined, the system may determine a reliability metric associated with the video frame data based on the time difference as well as the distance and the number of non-stationary objects. As mentioned above, each of these parameters may be associated with a particular weighting, and therefore contribute to the overall reliability metric. For example, the time difference may be used to determine to a first sub-metric, the distance may be used to determine a second sub-metric and the number of non-stationary objects may be used to determine a third sub-metric.

Following on from the example discussed above, the weighting associated with the time difference may be 0.6, the weighting associated with the distance may be 0.3 and the weighting associated with the number of non-stationary objects may be 0.1.

As an example, the time difference may be 1 second, so the sub-metric for the time difference may be determined to be 1, the distance travelled by the vehicle may be 5 meters, so the sub-metric for distance may be determined to be 0.8 and the number of non-stationary objects may be relatively high, resulting in the sub-metric for the number of non-stationary objects being 0.2. Based on the example weights mentioned above, $M=0.6 \times 1 + 0.3 \times 0.8 + 0.1 \times 0.2 = 0.86$. As another example, the time difference may be 1 second, so the sub-metric for the time difference may be determined to be 1, the distance travelled by the vehicle may be 5 meters, so the sub-metric for distance may be determined to be 0.8 and the number of non-stationary objects may be relatively low, resulting in the sub-metric for the number of non-stationary objects being 1. Based on the example weights mentioned above, $M=0.6 \times 1 + 0.3 \times 0.8 + 0.1 \times 1 = 0.94$. It therefore follows that a greater number of non-stationary objects contributes to a lower reliability metric.

Example 4

In a fourth example, the vehicle 110 transmits to the system 100 (or the system 100 itself determines) additional data associated with the video frame data, where the additional data associated with the video frame data comprises a timestamp. In addition, the system 100 receives or determines additional data associated with the vehicle, such as a distance travelled by the vehicle in a particular time period (such as the distance travelled since the last video frame data was transmitted to the system). The system 100 also receives or determines additional data associated with the environment, which includes the number of non-stationary objects in the environment. In addition, the system 100 receives or determines a local time associated with the vehicle.

As previously discussed, the system 110 can determine a time difference associated with the video frame data based on the timestamp.

Once the time difference has been determined, the system may determine a reliability metric associated with the video frame data based on the time difference as well as the distance, the number of non-stationary objects and the local time. As mentioned above, each of these parameters may be associated with a particular weighting, and therefore contribute to the overall reliability metric. For example, the time difference may be used to determine to a first sub-metric, the distance may be used to determine a second sub-metric, the number of non-stationary objects may be used to determine a third sub-metric and the local time may be used to determine a fourth sub-metric.

Following on from the example discussed above, the weighting associated with the time difference may be 0.6, the weighting associated with the distance may be 0.2, the weighting associated with the number of non-stationary objects may be 0.1 and the weighting associated with the local time may be 0.1.

As an example, the time difference may be 1 second, so the sub-metric for the time difference may be determined to be 1, the distance travelled by the vehicle may be 5 meters, so the sub-metric for distance may be determined to be 0.8, the number of non-stationary objects may be relatively high, resulting in the sub-metric for the number of non-stationary objects being 0.2 and the local time may indicate that it is daytime, resulting in the sub-metric for local time being 0.5. Daytime, in contrast to nighttime, for example, may imply that there are more pedestrians, vehicles or other hazards. However, in some areas/locations, the inverse may be true. Location may therefore also be taken into consideration. Based on the example weights mentioned above, $M=0.6 \times 1+0.2 \times 0.8+0.1 \times 0.2+0.1 \times 0.5=0.83$. As another example, the time difference may be 1 second, so the sub-metric for the time difference may be determined to be 1, the distance travelled by the vehicle may be 5 meters, so the sub-metric for distance may be determined to be 0.8, the number of non-stationary objects may be relatively low, resulting in the sub-metric for the number of non-stationary objects being 1, and the local time may indicate that it is nighttime, resulting in the sub-metric for local time being 1. Based on the example weights mentioned above. $M=0.6 \times 1+0.2 \times 0.8+0.1 \times 1+0.1 \times 1=0.96$.

Example Outputs on a Display

As mentioned, once the reliability metric associated with the video frame data has been determined, the output on the display 106 can be generated based on the reliability metric. For example, the processor(s) 102 of the system 100 can cause the output on the display 106 to be generated or updated based on the reliability metric, and subsequently displayed on the display 106.

Figure 2:
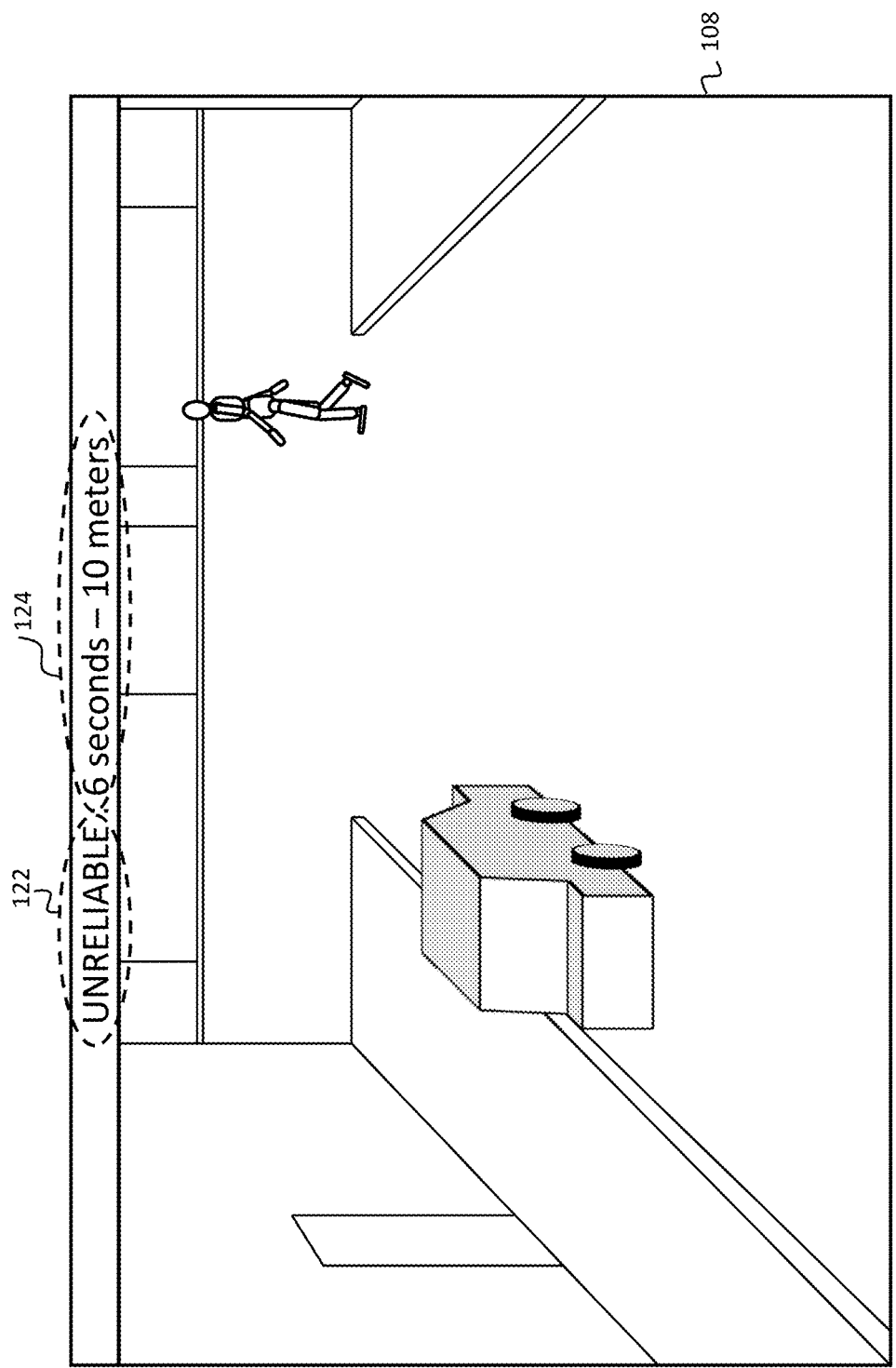
FIG. 2 is a pictorial diagram of a first example output on a display at the remote system.

FIG. 2 depicts a close up of the output on the display 106 as viewed by the operator 118. As shown, the output on the display 106 includes the representation 108 of the video frame data in addition to a graphical item 122 being be displayed over, near to, or next to the representation 108. The graphical item 122 is based on the reliability metric, and can indicate to the operator 118 the reliability metric. For example, the type or form/appearance (and in some cases, presence or absence) of the graphical item 122 can indicate the reliability metric. By causing the output of the display 106 to include a graphical item 122 that is based on the reliability metric, the operator 118 can be informed of the reliability of the video frame data, and thereby make informed decisions. For example, if the video frame data is considered unreliable, the operator 118 may avoid or be more cautious about providing navigation instructions to the vehicle 110.

In this example, the graphical item 122 is represented by pixels arranged to form one or more characters, where the characters indicate the reliability metric, such as "Unreliable", "Reliable", "Moderately Reliable", "Moderately Unreliable" etc.

In examples where the reliability metric has a numerical value, as in the examples discussed above, the graphical item 122 may be based on the reliability metric, which may involve comparing the reliability metric to a threshold reliability metric and determining a graphical item based on the comparison.

For example, if the reliability metric is less than a threshold, such as 0.5, the graphical item 122 may correspond to a first graphical item, and if the reliability metric is greater than the threshold, the graphical item 122 may correspond to a second graphical item, where the first and second graphical items are different (such as visually different or distinctive). In another example, the reliability metric may be compared to two or more threshold reliability metrics. For example, if the reliability metric is less than a first threshold, such as 0.3, the graphical item 122 may correspond to a first graphical item, and if the reliability metric is greater than the first threshold and less than a second threshold, such as 0.7, the graphical item 122 may correspond to a second graphical item, and if the reliability metric is greater than the second threshold, the graphical item 122 may correspond to a third graphical item, where the first, second and third graphical items are different (such as visually different or distinctive). Different graphical items may therefore be displayed depending upon the reliability metric. As an example, the first graphical item 112 may be characters arranged to display "Unreliable", the second graphical item 112 may be characters arranged to display "Moderately Reliable", and the third graphical item 112 may be a number of characters arranged to display "Reliable".

As will be explained in relation to further Figures, the graphical item 122 may not represent characters (such as numerical values or text), and may instead be represented by pixels in other arrangements, such as a particular shape. In either case, however, the graphical item (such as the arrangement/form, size (such as the number of pixels occupied by the graphical item on the display), color, position/location and/or opacity of the graphical item, etc.) may be based on the reliability metric. For example, a first graphical item 112 may correspond to a coloured border surrounding the representation 108 or a coloured bar on top of, next to or adjacent the representation 108 (such as along the top of the representation 108). A second graphical item 112 may be a differently coloured or sized border or bar, and a third graphical item 112 may be another differently coloured or sized border or bar. Accordingly, different characteristics of the graphical item may be different based on the reliability metric.

In some cases, where the reliability metric is such that the video frame data is considered reliable, the output on the display 106 may be generated to not include a graphical item 122. Graphical items may therefore only be displayed if the video frame becomes less reliable (such as when the reliability metric is below a particular threshold).

In some cases, where the reliability metric is such that the video frame data is considered too unreliable, the output on the display 106 may be generated to not include a graphical item 122, and another change in the output may occur instead. For example, rather than displaying a graphical item, the representation of the video frame data may cease to be displayed.

As an alternative to determining a graphical item corresponding to the reliability metric, the graphical item 122 may itself indicate the reliability metric. For example, instead of determining a graphical item 122 that corresponds to the reliability metric, the reliability metric may itself be shown instead. For example, the graphical item 122 may correspond to a numerical value of the reliability metric. Following on from the examples discussed earlier, the graphical item may display "0.94" or "0.1" etc., thereby directly displaying the determined reliability metric. As previously mentioned, the reliability metric may not always have a numerical value, and may instead correspond to some other indicator. For example, the reliability metric may be "Unreliable" or "Reliable" or "Red" or "Green" or "OK" or "Caution".

The graphical item 122 may be positioned relative to the representation 108 of the video frame data. For example, the graphical item 122 may be arranged over (i.e., obscuring) a portion of the displayed representation, next to (i.e., adjacent) the representation 108, or near to the representation 108. In some cases, the graphical item 122 may not be considered to be positioned "near" to the representation 108, but may be positioned such that it is clear to the operator 118 that the graphical item 122 is associated with the displayed representation 108 of the video frame data. For example, if the display 106 output is generated to contain two or more different representations of video frame data (such as corresponding to two or more different views from different sensors 112 on the vehicle 110), and the video frame data from each sensor is associated with a separate reliability metric, it may be necessary to position each graphical item 122 to ensure that it is clear to the operator 118 which graphical item 122 is associated with which representation. In cases where the display 106 contains only one representation of video frame data, regardless of where the graphical item 122 is positioned, it may be clear to the operator 118 that the graphical item 122 is associated with the displayed representation.

In some examples, in addition to, or instead of a graphical item, the system 100 may cause the output of the display to include a representation 124 of some or all of the additional data determined by the system 100 or received from the vehicle 110. In one case, the representation 124 may include some or all of the additional data used to determine the reliability metric. By causing the output of the display 106 include a representation 124 of the additional data used to determine the reliability metric, the operator 118 can be informed as to why the video frame data is associated with a particular reliability metric. For example, it may be useful for an operator 118 to know that a particular reliability metric is because the video frame data is associated with a large time difference or because the vehicle is moving at a high speed.

FIG. 2 therefore includes a representation 124 of the time difference and the distance travelled by the vehicle 110. In some cases, the representation 124 may include only some of the additional data, such as the time difference. In a particular case, the representation 124 may include only the additional data associated with the highest weighting (in this case, time difference).

Figure 3:
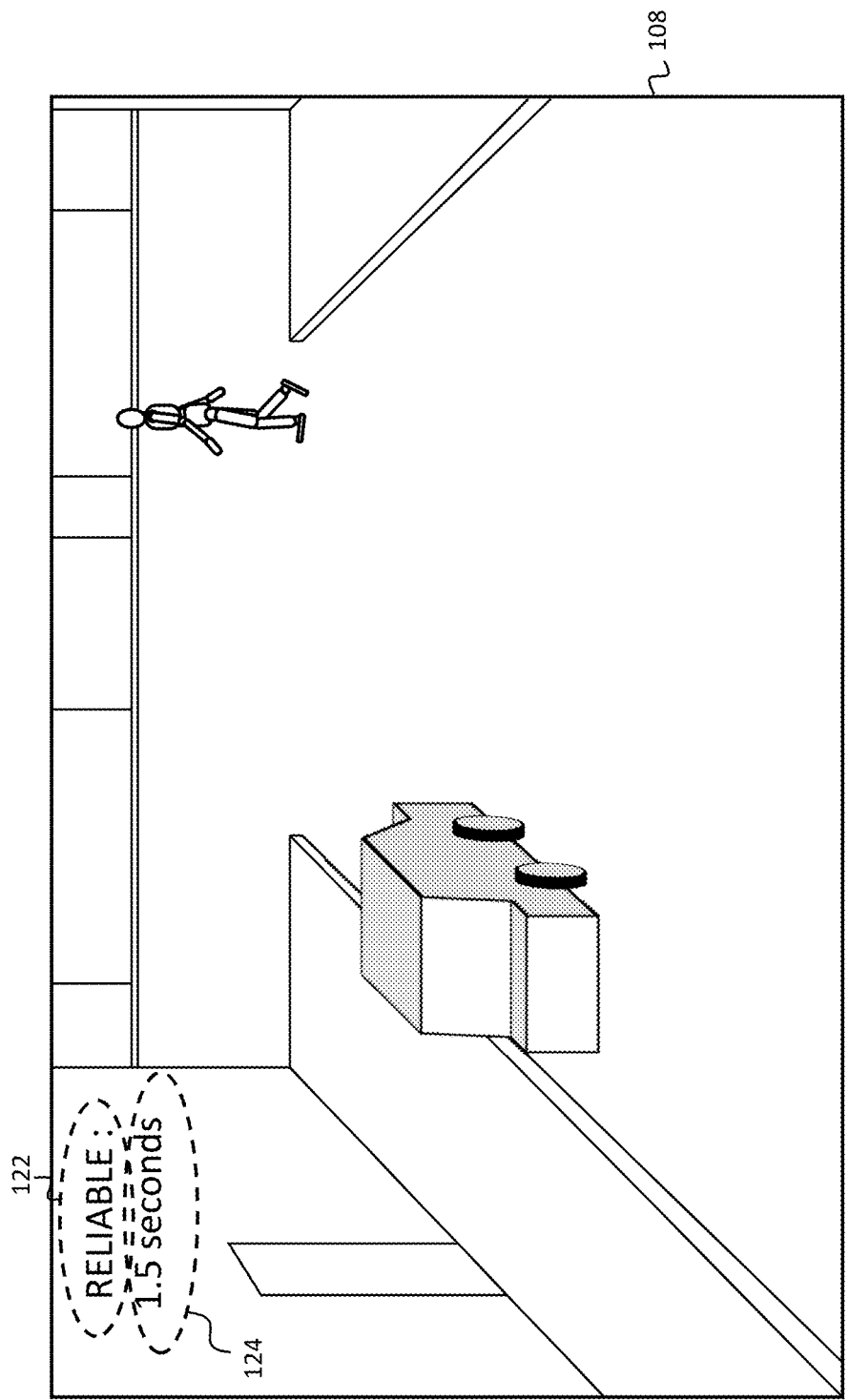
FIG. 3 is a pictorial diagram of a second example output on a display at the remote system.

In the example of FIG. 2, the representation 124 of the additional data and the graphical item 122 are displayed adjacent the representation 108 of the video frame data. In FIG. 3, the representation 124 of the additional data and the graphical item 122 are displayed over the representation 108 of the video frame data, and therefore partially obscure the representation 108.

Further examples of generating and displaying an output based on the reliability metric will be explained in relation to FIGS. 4-12.

FIG. 4A depicts another close up of an output on the display 106 as viewed by the operator 118 at a first time. In this scenario, the network conditions are such that the video frame data has been received by the system 100 shortly after being recorded by the vehicle 110, and as such, the reliability metric determined by the system 100 indicates that the video frame data is reliable. For example, the reliability metric may be above a particular threshold that indicates it is reliable. As an example, the reliability metric may have been determined to have a value of 1, or greater than 0.9.

As shown, the output on the display 106 is generated to include the representation 108 of the video frame data. In this example, because the reliability metric determined by the system 100 indicates that the video frame data is sufficiently reliable, the output may not include a graphical item and/or may not include a representation of any additional data determined by the system 100 or received from the vehicle 110.

In other cases, however, even if the video frame data is considered sufficiently reliable, the output may include a graphical item based on the reliability metric and/or a representation of any additional data determined by the system 100 or received from the vehicle 110.

FIG. 4B depicts a close up of the output on the display 106 as viewed by the operator 118 at a second time, where the second time is later than the first time. In this scenario, the network conditions are such that no further frames of video data have been received by the system 100. The output on the display 106 therefore continues to include the same representation 108 of the video frame data as displayed at the first time. However, due at least to the passage of time, the video frame data may be less reliable than it was at the first time. For example, the vehicle 110 may have moved to a different location.

Accordingly, a further/updated reliability metric may be determined for the same video frame data. In some cases, a reliability metric associated with video frame data may be determined periodically, such as 30 times per second, 15 times per second, twice per second, or once every second, etc. In some cases, an updated reliability metric may only be determined when no further video frame data is received. For example, under normal network conditions, new video frame data corresponding to a subsequent frame of video data may be received by the system 100 at a particular rate, such as 30 Hz (i.e., a new video frame may be received once every 30 seconds). If subsequent video frame data is not received when expected, the system 100 may determine a new reliability metric associated with the previously received video frame data. In one case, the rate at which an updated reliability metric associated with video frame data is determined may be equal to, or less than the rate at which video frame data is usually received by the system 100. Accordingly, if subsequent video frame data is received, the system 100 may not determine an updated reliability metric associated with previously received video frame data, and may instead determine a reliability metric associated with subsequently received video frame data. Conversely, if subsequent video frame data is not received, the system 100 may determine an updated reliability metric associated with previously received video frame data, and the output on the display may be updated based on the updated reliability metric. Updating the output may comprise generating an updated output and causing the display to display the updated output.

Accordingly, in the example of FIG. 4B, given the passage of time, an updated reliability metric may indicate that the video frame data is less reliable at representing the environment in which the vehicle is located at the current time than the previously determined reliability metric.

In FIG. 4B, the generated output on the display 106 includes the representation 108 of the video frame data and a graphical item 122 based on the reliability metric. In this example, the graphical item 122 is in the form of a "bar", where the size (such as the length) of the bar is based on the reliability metric. For example, if the reliability metric was lower (meaning that the video frame data is less reliable), the size/length of the bar may be larger/longer than if the reliability metric was higher (meaning the video frame data is more reliable).

The graphical item 122 may therefore occupy a greater number of pixels on the display 106 when the video frame data is less reliable than when the video frame data is more reliable. A greater number of pixels may be more likely to be noticed by the operator 118, increasing the likelihood of the operator 118 noting the decreased reliability. In other examples, different methods of varying the visual prominence of the graphical item 122 may be used, including providing different graphical items having different characteristics, such as a graphical item having a different arrangement/form, size, color, position/location and/or opacity.

As an example, the reliability metric at this moment in time may have been determined to have a value of 0.6. In examples, the length of the bar may therefore correspond to 1–0.6 (i.e., 40%) of a total maximum length of a bar that can be displayed. More generally, the size (such as length) of the graphical item may be based on the following:

$$DP = AP\left[1 - \frac{R}{R_{MAX} - R_{MIN}}\right],$$

where DP is the number of displayed pixels of the graphical item, AP is the total number of available pixels to display the graphical item (and the minimum value of the reliability metric scale, associated with the most unreliable video frame data, would occupy all of the available pixels), R is the determined reliability metric, $R_{MAX}$ is the maximum reliability metric in the reliability metric scale and $R_{MIN}$ is the minimum reliability metric in the reliability metric scale. As an example, if the maximum length of the graphical item can be 200 pixels wide, and the reliability metric scale runs from 0 to 1 (so $R_{MAX}$ is 1 and $R_{MIN}$ is 0), then the graphical item may have a length, DP=0 for R=1. DP=200 for R=0. DP=100 for R=0.5, DP=140 for R=0.3, etc.

Although the graphical item 122 of this example is displayed as being adjacent to the representation 108 of the video frame data, the graphical item 122 may be positioned elsewhere in other examples, as previously explained.

In some examples, the output on the display may be generated to additionally include a representation of any additional data determined by the system 100 or received from the vehicle 110.

FIG. 4C depicts a close up of the output on the display 106 as viewed by the operator 118 at a third time, where the third time is later than the second time. In this scenario, the network conditions are still such that no further frames of video data have been received by the system 100. The output on the display 106 therefore continues to include the same representation 108 of the video frame data as displayed at the first and second times. However, due at least to the further passage of time, the video frame data may be less reliable than it was at the first time. For example, the vehicle 110 may have moved to a different location.

Accordingly, in the example of FIG. 4C, given the passage of time, an updated reliability metric may indicate that the video frame data is less reliable at representing the environment in which the vehicle is located at the current time than the previously determined reliability metric.

In FIG. 4C, the output on the display 106 includes the representation 108 of the video frame data and an updated graphical item 122 based on the reliability metric. Given that the reliability metric has changed, the graphical item 122 may also change. In this case, because the reliability metric is such that it indicates the video frame data is less reliable than the previously determined reliability metric, the graphical item 122 may change in contrast to the previously displayed graphical item 122. In this example, the graphical item 122 therefore occupies a greater number of pixels on the display 106 than the graphical item displayed at the second time. As mentioned, alternative or additional characteristics of the graphical item may be changed.

As an example, the reliability metric at this moment in time may have been determined to have a value of 0. In examples, the length of the bar may therefore correspond to a total maximum length of a bar that can be displayed.

Although the graphical item 122 of this example is displayed as being adjacent to the representation 108 of the video frame data, the graphical item 122 may be positioned elsewhere in other examples, as previously explained.

In some examples, the characteristics of the graphical item 122 do not vary based on the reliability metric. For example, instead, a graphical item 122 may be displayed when the reliability metric is below a particular threshold, and no graphical item is displayed when the reliability metric is above the particular threshold. In some cases, the presence of the graphical item is based on the reliability metric, rather than characteristics of the graphical item being based on the reliability metric.

In some examples, the output on the display 106 may additionally include a representation of any additional data determined by the system 100 or received from the vehicle 110.

In some examples, rather than replacing a previously displayed item with a different item, the number of items displayed may change based on the reliability metric. Together, these separate items may be classed as a graphical item, even if the items are displayed separate from each other. The size of the graphical item may therefore be said to change as the number of items displayed changes. For example, a graphical item associated with reliable video frame data may take the form of a single "star" (forming a first graphical item) displayed over the video frame data and a graphical item associated with less reliable video frame data may take the form of two or more stars (together forming a second graphical item) displayed over the video frame data.

In a variation of FIGS. 4A-4C, instead of (or in addition to) the graphical item 122 being in the form of a "bar", the graphical item 122 may be a border displayed around the edge of the representation 108 of the video frame data. The border may have particular characteristics based on the reliability metric. For example, the border may have a particular "thickness" and/or colour and/or design based on the reliability metric. For example, when the video frame data is considered less reliable, the border may have a thickness that is greater than when video frame data is more reliable.

FIG. 5A depicts another close up of an output on the display 106 as viewed by the operator 118 at a first time. In this scenario, the network conditions are such that the video frame data has been received by the system 100 shortly after being recorded by the vehicle 110, and as such, the reliability metric determined by the system 100 indicates that the video frame data is reliable. For example, the reliability metric may be above a particular threshold that indicates it is reliable. As an example, the reliability metric may have been determined to have a value of 1.

As shown, the output on the display 106 includes the representation 108 of the video frame data. In this example, the output is generated to include a graphical item 122 based on the reliability metric. In particular, the graphical item 122 itself indicates the reliability metric. For example, instead of determining a graphical item 122 that corresponds to the reliability metric (as in the examples of FIGS. 4A-C), the reliability metric may itself be shown instead. FIG. 5A therefore depicts a graphical item 122 showing a reliability metric of 1.

FIG. 5B depicts a close up of the output on the display 106 as viewed by the operator 118 at a second time, where the second time is later than the first time. In this scenario, the network conditions are such that no further frames of video data have been received by the system 100. The output on the display 106 therefore continues to include the same representation 108 of the video frame data as displayed at the first time. However, due at least to the passage of time, the video frame data may be less reliable than it was at the first time. For example, the vehicle 110 may have moved to a different location.

Accordingly, in the example of FIG. 5B, given the passage of time, an updated reliability metric may indicate that the video frame data is less reliable at representing the environment in which the vehicle is located at the current time than the previously determined reliability metric.

In FIG. 5B, the output on the display 106 is generated to include the representation 108 of the video frame data and a different graphical item 122 based on the reliability metric. As an example, the reliability metric at this moment in time may have been determined to have a value of 0.6. As in FIG. 5A, the graphical item 122 itself indicates the reliability metric.

FIG. 5C depicts a close up of the output on the display 106 as viewed by the operator 118 at a third time, where the third time is later than the second time. In this scenario, the network conditions have improved, and subsequent video frame data (corresponding to a subsequent frame of video) has been received by the system 100. The output on the display 106 therefore includes a representation 108 of the subsequently received video frame data (which is different to the representation displayed at the first and second times). FIG. 5C shows, for example, that the person has now crossed the road, and is located in a different position.

In this particular case, now that the network conditions have improved, the reliability metric determined by the system 100 indicates that the video frame data is more reliable again. As an example, the reliability metric may have been determined to have a value of 0.9.

In FIG. 5C, the output on the display 106 is generated to include the representation 108 of the video frame data and an updated graphical item 122 based on the reliability metric. As in FIGS. 5A and 5B, the graphical item 122 itself indicates the reliability metric.

Although the graphical items 122 of these examples are displayed as being adjacent to the representation 108 of the video frame data, the graphical items 122 may be positioned elsewhere in other examples, as previously explained. In some examples, the output on the display may additionally include a representation of any additional data determined by the system 100 or received from the vehicle 110.

Figure 6A:
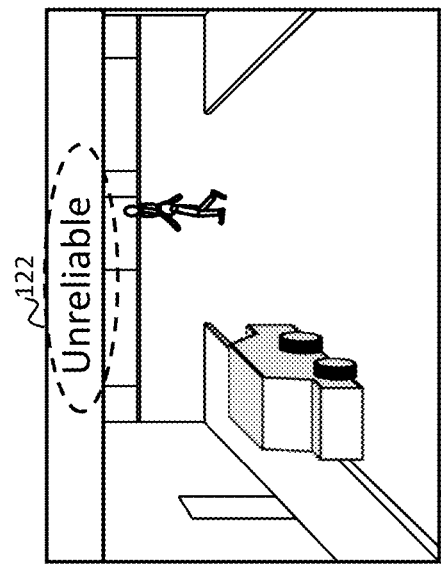

FIG. 6A depicts another close up of an output on the display 106 as viewed by the operator 118 at a first time. In this scenario, the network conditions are such that the video frame data has been received by the system 100 shortly after being recorded by the vehicle 110, and as such, the reliability metric determined by the system 100 indicates that the video frame data is reliable.

In this example, the reliability metric is non-numerical. Furthermore, the reliability metric is also binary, taking one of two forms, in this case: "Reliable" or "Unreliable". For example, the reliability metric may be determined based on a single parameter, such as a time difference, and if the time difference is below a threshold, the reliability metric may be determined to be "Reliable" and if the time difference is above the threshold, the reliability metric may be determined to be "Unreliable". It will be appreciated that a binary reliability metric may also be determined based on two or more parameters, such as a time difference and distance or speed, for example.

As shown, the output on the display 106 is generated to include the representation 108 of the video frame data. In this example, the output includes a graphical item 122 based on the reliability metric. In particular, the graphical item 122 itself indicates the reliability metric. For example, instead of determining a graphical item 122 that corresponds to the reliability metric (as in the examples of FIGS. 4A-C), the reliability metric may itself be shown instead. FIG. 6A therefore depicts a graphical item 122 showing a reliability metric of "Reliable".

Figure 6B:
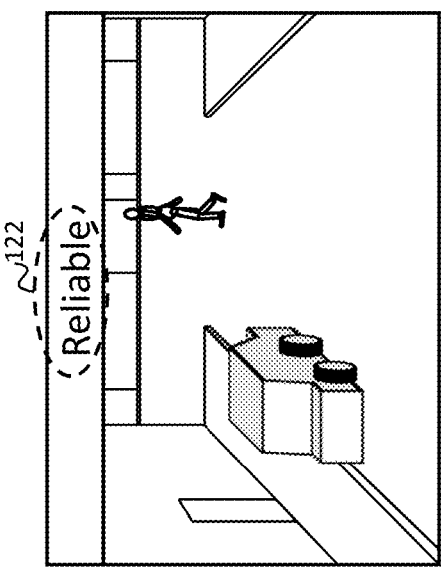

FIG. 6B depicts a close up of the output on the display 106 as viewed by the operator 118 at a second time, where the second time is later than the first time. In this scenario, the network conditions remain stable, and subsequent video frame data (corresponding to a subsequent frame of video) has been received by the system 100. The output on the display 106 therefore includes a representation 108 of the subsequently received video frame data (which is different to the representation displayed at the first time). FIG. 6B shows, for example, that the person is in a different position.

In this particular case, the reliability metric determined by the system 100 again indicates that the video frame data is reliable. As an example, the reliability metric may have been determined to be "Reliable".

In FIG. 6B, the output on the display 106 includes the representation 108 of the video frame data and a graphical item 122 based on the reliability metric. As in FIG. 6A, the graphical item 122 itself indicates the reliability metric.

Figure 6C:
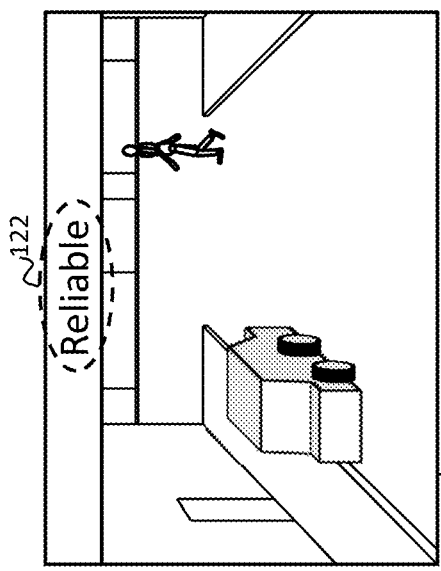

FIG. 6C depicts a close up of the output on the display 106 as viewed by the operator 118 at a third time, where the third time is later than the second time. In this scenario, the network conditions are such that no further frames of video data have been received by the system 100. The output on the display 106 therefore continues to include the same representation 108 of the video frame data as displayed at the second time. However, due at least to the passage of time, the video frame data may be less reliable than it was at the second time. For example, the vehicle 110 may have moved to a different location.

Accordingly, in the example of FIG. 6C, given the passage of time, an updated reliability metric may indicate that the video frame data is less reliable at representing the environment in which the vehicle is located at the current time than the previously determined reliability metric.

In FIG. 6B, the output on the display 106 is generated to include the representation 108 of the video frame data and a different graphical item 122 based on the reliability metric. As an example, the reliability metric at this moment in time may have been determined to be "Unreliable". As in FIGS. 6A and 6B, the graphical item 122 itself indicates the reliability metric.

Although the graphical items 122 of these examples are displayed as being adjacent to the representation 108 of the video frame data, the graphical items 122 may be positioned elsewhere in other examples, as previously explained. In some examples, the output on the display may additionally include a representation of any additional data determined by the system 100 or received from the vehicle 110.

Figure 7A:
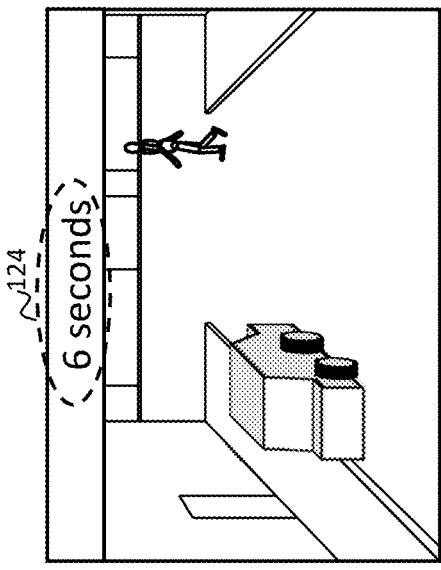

FIG. 7A depicts another close up of an output on the display 106 as viewed by the operator 118 at a first time. In this scenario, the network conditions are such that the video frame data has been received by the system 100 shortly after being recorded by the vehicle 110, and as such, the reliability metric determined by the system 100 indicates that the video frame data is reliable. For example, the reliability metric may be above a particular threshold that indicates it is reliable. As an example, the reliability metric may have been determined to have a value of 1, or greater than 0.9.

As shown, the output on the display 106 includes the representation 108 of the video frame data. In this example, the output of the display 106 is generated to also include a representation 124 of some or all of the additional data determined by the system 100 or received from the vehicle 110. For example, the representation 124 may include some or all of the additional data used to determine the reliability metric. In this particular case, the representation 124 includes the time difference determined by the system 100. In some cases, the representation 124 may include different and/or additional data, such as the distance/speed.

Figure 7B:
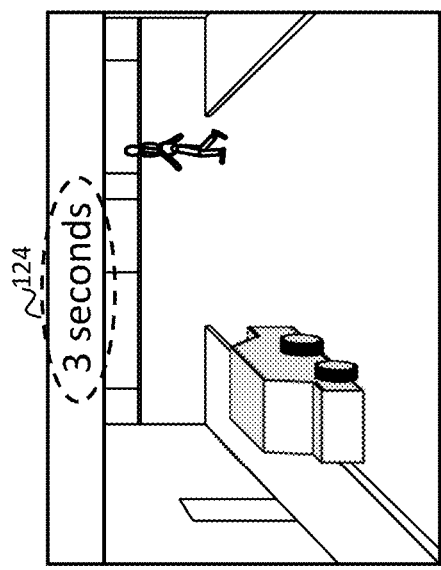

FIG. 7B depicts a close up of the output on the display 106 as viewed by the operator 118 at a second time, where the second time is later than the first time. In this scenario, the network conditions are such that no further frames of video data have been received by the system 100. The output on the display 106 therefore continues to include the same representation 108 of the video frame data as displayed at the first time. However, due at least to the passage of time, the video frame data may be less reliable than it was at the first time. For example, the vehicle 110 may have moved to a different location.

Accordingly, a further/updated reliability metric may be determined for the same video frame data and given the passage of time, the updated reliability metric may indicate that the video frame data is less reliable at representing the environment in which the vehicle is located at the current time than the previously determined reliability metric.

In FIG. 7B, the output on the display 106 is generated to include the representation 108 of the video frame data and a representation 124 of some or all of the additional data determined by the system 100 or received from the vehicle 110. For example, the representation 124 may include some or all of the additional data used to determine the reliability metric. In this particular case, the representation 124 includes an updated time difference determined by the system 100, where the time difference is greater than the time difference determined in FIG. 7A due to the passage of time. In some cases, the representation 124 may include different and/or additional data, such as the distance/speed.

Figure 7C:
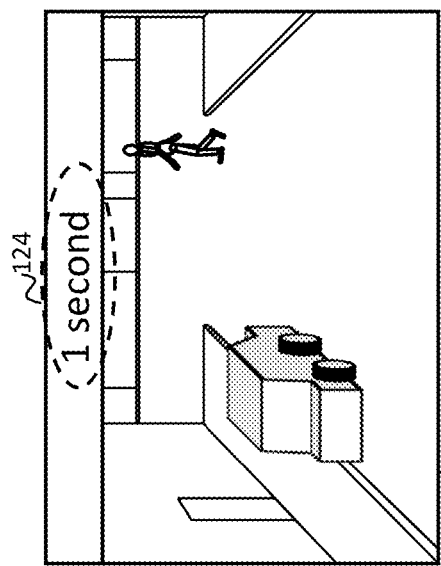

FIG. 7C depicts a close up of the output on the display 106 as viewed by the operator 118 at a third time, where the third time is later than the second time. In this scenario, the network conditions are still such that no further frames of video data have been received by the system 100. The output on the display 106 therefore continues to include the same representation 108 of the video frame data as displayed at the first and second times. However, due at least to the further passage of time, the video frame data may be less reliable than it was at the first and second time. For example, the vehicle 110 may have moved to a different location.

Accordingly, a further/updated reliability metric may be determined for the same video frame data and given the passage of time, the updated reliability metric may indicate that the video frame data is less reliable at representing the environment in which the vehicle is located at the current time than the previously determined reliability metric.

In FIG. 7C, the output on the display 106 is generated to include the representation 108 of the video frame data and a representation 124 of some or all of the additional data determined by the system 100 or received from the vehicle 110. For example, the representation 124 may include some or all of the additional data used to determine the reliability metric. In this particular case, the representation 124 includes an updated time difference determined by the system 100, where the time difference is greater than the time difference determined in FIG. 7B due to the further passage of time. In some cases, the representation 124 may include different and/or additional data, such as the distance/speed.

Although the representations 124 of the additional data of these examples are displayed as being adjacent to the representation 108 of the video frame data, the representations 124 may be positioned elsewhere in other examples, as previously explained. In some examples, the output on the display may additionally include a graphical item based on the reliability metric.

Figure 8C:
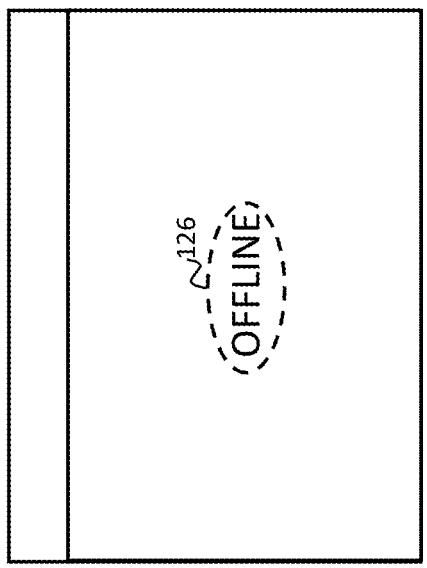
Figure 8B:
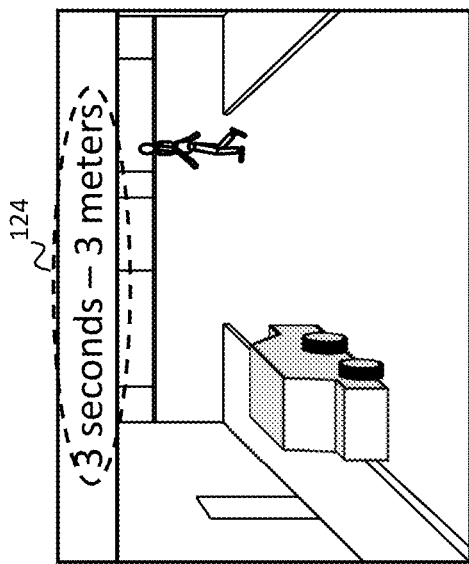
Figure 8A:
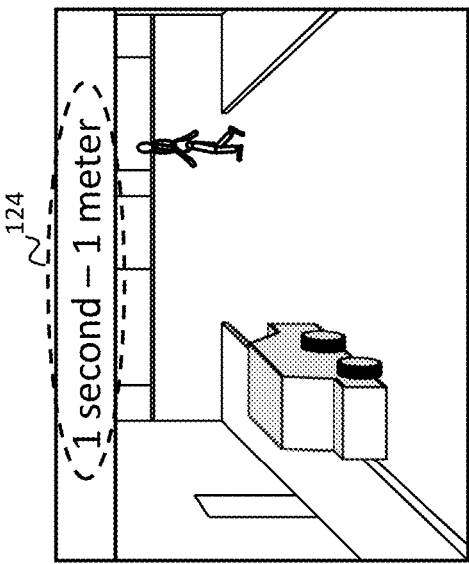

FIG. 8A depicts another close up of an output on the display 106 as viewed by the operator 118 at a first time. In this scenario, the network conditions are such that the video frame data has been received by the system 100 shortly after being recorded by the vehicle 110, and as such, the reliability metric determined by the system 100 indicates that the video frame data is reliable. For example, the reliability metric may be above a particular threshold that indicates it is reliable. As an example, the reliability metric may have been determined to have a value of 1, or greater than 0.9.

As shown, the output on the display 106 includes the representation 108 of the video frame data.

In this example, the output of the display 106 is generated to also include a representation 124 of some or all of the additional data determined by the system 100 or received from the vehicle 110. For example, the representation 124 may include some or all of the additional data used to determine the reliability metric. In this particular case, the representation 124 includes the time difference determined by the system 100 and the distance travelled by the vehicle 110 in a particular time period. In some cases, the representation 124 may include different and/or additional data.

FIG. 8B depicts a close up of the output on the display 106 as viewed by the operator 118 at a second time, where the second time is later than the first time. In this scenario, the network conditions are such that no further frames of video data have been received by the system 100. The output on the display 106 therefore continues to include the same representation 108 of the video frame data as displayed at the first time. However, due at least to the passage of time, the video frame data may be less reliable than it was at the first time. For example, the vehicle 110 may have moved to a different location.

Accordingly, a further/updated reliability metric may be determined for the same video frame data and given the passage of time, the updated reliability metric may indicate that the video frame data is less reliable at representing the environment in which the vehicle is located at the current time than the previously determined reliability metric.

In FIG. 8B, the output on the display 106 is generated to include the representation 108 of the video frame data and a representation 124 of some or all of the additional data determined by the system 100 or received from the vehicle 110. For example, the representation 124 may include some or all of the additional data used to determine the reliability metric. In this particular case, the representation 124 includes an updated time difference determined by the system 100, where the time difference is greater than the time difference determined in FIG. 7A due to the passage of time, as well as an updated distance. In some cases, the representation 124 may include different and/or additional data.

Although the representations 124 of the additional data of these examples are displayed as being adjacent to the representation 108 of the video frame data, the representations 124 may be positioned elsewhere in other examples, as previously explained. In some examples, the output on the display may additionally include a graphical item 122 based on the reliability metric.

FIG. 8C depicts a close up of the output on the display 106 as viewed by the operator 118 at a third time, where the third time is later than the second time. In this scenario, the network conditions are still such that no further frames of video data have been received by the system 100. However, due at least to the further passage of time, the video frame data may be less reliable than it was at the first and second times. For example, the vehicle 110 may have moved to a different location.

A further/updated reliability metric may be determined for the same video frame data and given the passage of time, the updated reliability metric may indicate that the video frame data is less reliable at representing the environment in which the vehicle is located at the current time than the previously determined reliability metric. In this particular case, the reliability metric may be such that rather than displaying the representation 108 of the video frame data, the system 100 may cause the display to cease the output of the representation 108 of the video frame data. For example, the reliability metric may be below a threshold, and when the reliability metric is below the threshold, the video frame data may be considered so unreliable it should not be displayed to an operator.

In some cases, a graphical item 126 may be displayed based on the reliability metric. For example, the graphical item 126 may indicate that the video stream is "OFFLINE". In a particular case, the graphical item 126 may be displayed in a position on the display where the representation 108 of the video frame data was previously displayed. The graphical item 126 may be displayed based on the system determining not to display the representation of the video frame data.

In some cases, the output on the display 106 may also include a representation of some or all of the additional data determined by the system 100 or received from the vehicle 110, as in FIGS. 8A and 8B.

In some cases, based on the reliability metric, the representation 108 of the video frame data may be dimmed or faded (for example, by increasing the opacity) to indicate to the operator that the video frame data is unreliable or becoming unreliable. For example, when the reliability metric is below a threshold, the system may cause the display 106 to dim the output of the representation 108 of the video frame data.

In another example, when the reliability metric is below a first threshold, and above a second threshold, the system may cause the display 106 to dim the output of the representation 108 of the video frame data and when the reliability metric is below the second threshold, the system may cause the display 106 to cease the output of the representation 108 of the video frame data (as in FIG. 8C). When the reliability metric is above the first threshold, the system may cause the display 106 to output the representation 108 of the video frame data without dimming (i.e., at 0% opacity).

In another example, based on the reliability metric, the representation 108 of the video frame data may cease to be displayed, and instead historical/archived video frame data may be obtained and displayed instead. For example, when the reliability metric is below a threshold, the system may cause the display 106 to cease the output of the representation of the video frame data and output a representation of the historical video frame data, where the historical video frame data is indicative of the environment in which the vehicle is located at the current time. When the reliability metric is above the threshold, the system may cause the display 106 to output the representation 108 of the video frame data.

For example, based on the current location of the vehicle (which may be received by the system 100 from the vehicle 110 as part of the additional data), historical data associated with that location may be obtained by the system and a representation of the historical video frame data may be output on the display 106. For example, it may be useful for an operator 118 to view an example of the current environment around the vehicle, rather than view outdated video frame data of a prior location of the vehicle 110 (the prior location being that shown in the outdated video frame data). Depending upon the location, the operator 118 may decide to provide an instruction to the vehicle 110 even if the video frame data being observed isn't "live".

As previously mentioned, in some examples, the display 106 output may comprise two or more different representations of sensor data (such as video frame data), corresponding to data from two or more different sensors 112 on the vehicle 110. For example, the sensor data may comprise first sensor data and second sensor data, where the first sensor data is associated with (i.e., captured by) a first sensor 112 and the second sensor data is associated with a second sensor 112. The first and second sensor data may relate to two different views of the environment. More particularly, the video data may comprise first video frame data and second video frame data, where the first video frame data is associated with (i.e., captured by) a first video camera 112 and the second video frame data is associated with a second video camera 112. The first and second video frame data may relate to two different views of the environment.

Figure 9:
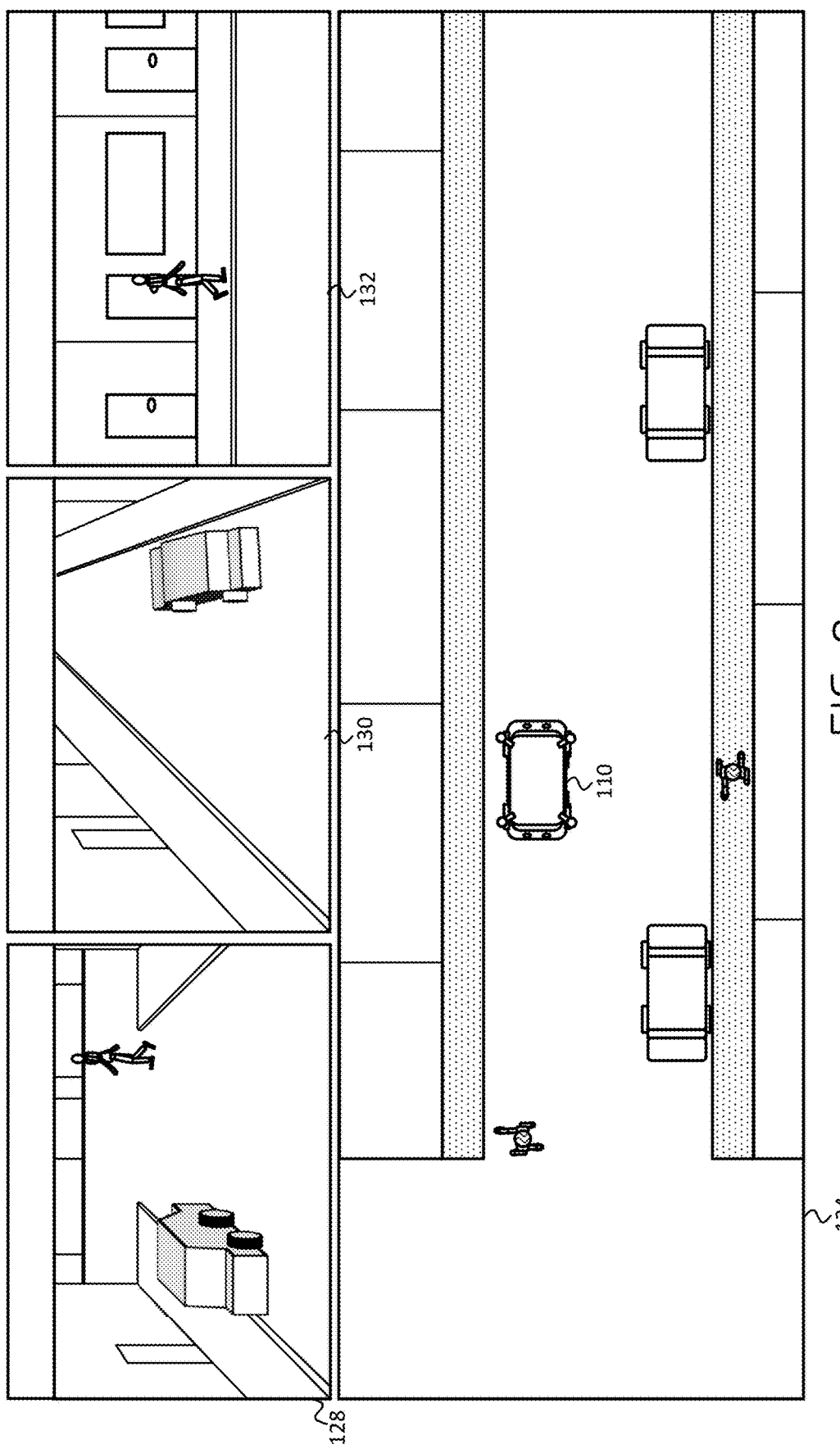

FIG. 9 depicts a close up of the output on the display 106 as viewed by the operator 118 at a particular time. As shown, FIG. 9 depicts a first representation 128 of first video frame data (or first sensor data), a second representation 130 of second video frame data (or second sensor data), and a third representation 130 of third video frame data (or third sensor data) on the display. In other examples, the output on the display may include two or more different representations. As shown, each representation corresponds to a different view of the environment. For example, the first representation 128 may relate to a forward view as seen by a first video camera on the vehicle 110, the second representation 130 may relate to a rear view as seen by a second video camera on the vehicle 110, and the third representation 130 may relate to a side view as seen by a third video camera on the vehicle 110. More generally, each representation may relate to a "view" of the environment as determined by one more sensors. For example, a representation may be based on sensor data from a video camera, two or more video cameras (where the data from each camera may be combined into a single representation), or one or more other sensors, such as one or more lidars.

As mentioned, although not shown in this example, the video frame data associated with each video camera may be associated with a separate reliability metric, and a graphical item 122 and/or representation 124 of the additional data may be displayed and associated with each representation. Alternatively, a single reliability metric may be associated with the video frame data from all of the video cameras, and a graphical item 122 and/or representation 124 of the additional data may be displayed and associated with all of the representations of the video frame data. More generally, each representation may be based on an associated reliability metric, as described in the examples above. For example, the output of each representation may be modified based on the reliability metric associated with that representation.

As also shown in FIG. 9, the output on the display may also include a 3D representation (or model) 134 of the environment. The 3D representation may comprise 3D models/renders of buildings, vehicles and pedestrians around the vehicles, as well as a 3D model/render of the vehicle 110 itself. The 3D representation may be generated by the system 100 based on additional data received from the vehicle, such as sensor data received from one or more lidar or radars on the vehicle 110. In examples, as discussed above, the 3D representation may be associated with a reliability metric. As such, any sensor data received from the vehicle may be associated with a reliability metric.

In examples where the sensor data is used to generate a model of the environment, a reliability metric may be determined for the entire representation of the sensor data (i.e., for the entire model displayed on the display). In other cases, however, two or more reliability metrics may be determined for a representation of the sensor data. For example, a first portion of the sensor data may be more reliable than a second portion of the sensor data, where both portions of the sensor data are used to generate the model that is represented on the display. Each portion of sensor data may be recorded by a different sensor on the vehicle, and accordingly, may be more or less reliable than other sensor data. For example, sensor data associated with one sensor may not be received by the system 100, whereas sensor data associated with another sensor may have been received by the system 100. In examples, a reliability metric may be determined for each sensor on the vehicle that provides sensor data for display to the operator. This may inform the operator which parts of the representation are more reliable than others. For example, one area in the representation may be more reliable than another area in the representation. In examples, each object may be associated with a reliability metric.

As disclosed herein, video or other sensor data may be provided to a teleoperator using a display or a portion of a display. Another view (display or portion of a display) may contain data that is rendered or otherwise presented to the user based on other sensor data. In examples, the video data (or other sensor data such as infrared or time of flight) may be human interpretable whereas the other sensor data on the rendered display may not be as easily interpretable without post processing or transformation. For example, the rendered display may be representative of data fused from lidar, fusion, vision, infrared, and/or other sensor data. In examples, the rendered view may correspond to a view that an autonomous driving component of a vehicle may action on. For example, it may be an output of a perception component wherein data from multiple fusion modalities are fused to create a common representation of an environment. In examples, the common representation can be transformed into a format that may be actioned on by a prediction and/or planning component of a vehicle. For example, the common representation may be a top-down view of an environment of a vehicle that may be represented by a multi-channel data structure, as described in U.S. Pat. No. 10,593,042 B1 which is hereby incorporated by reference in its entirety and for all purposes. This may allow a display to present a human-interpretable view of an environment and a view representative of the vehicle's understanding of the environment. The common representation may be generated by a component on the vehicle (e.g., a perception component) and/or may be generated by a corresponding component at a remote computing station (such as at a teleoperator station). For example, the teleoperator station may include a copy of the perception system such that the vehicle provide sensor data for post processing by the teleoperator station so that a common representation can be generated and rendered for the teleoperator to observe. This may allow the teleoperator to identify differences in the environment between what the teleoperator observers and what the vehicle's onboard perception system observes. The disclosed techniques may aid the teleoperator in determining whether differences are due to unreliably sensor data or not (e.g., an inability of the vehicle to correctly perceive a feature of an environment).

Figure 10:
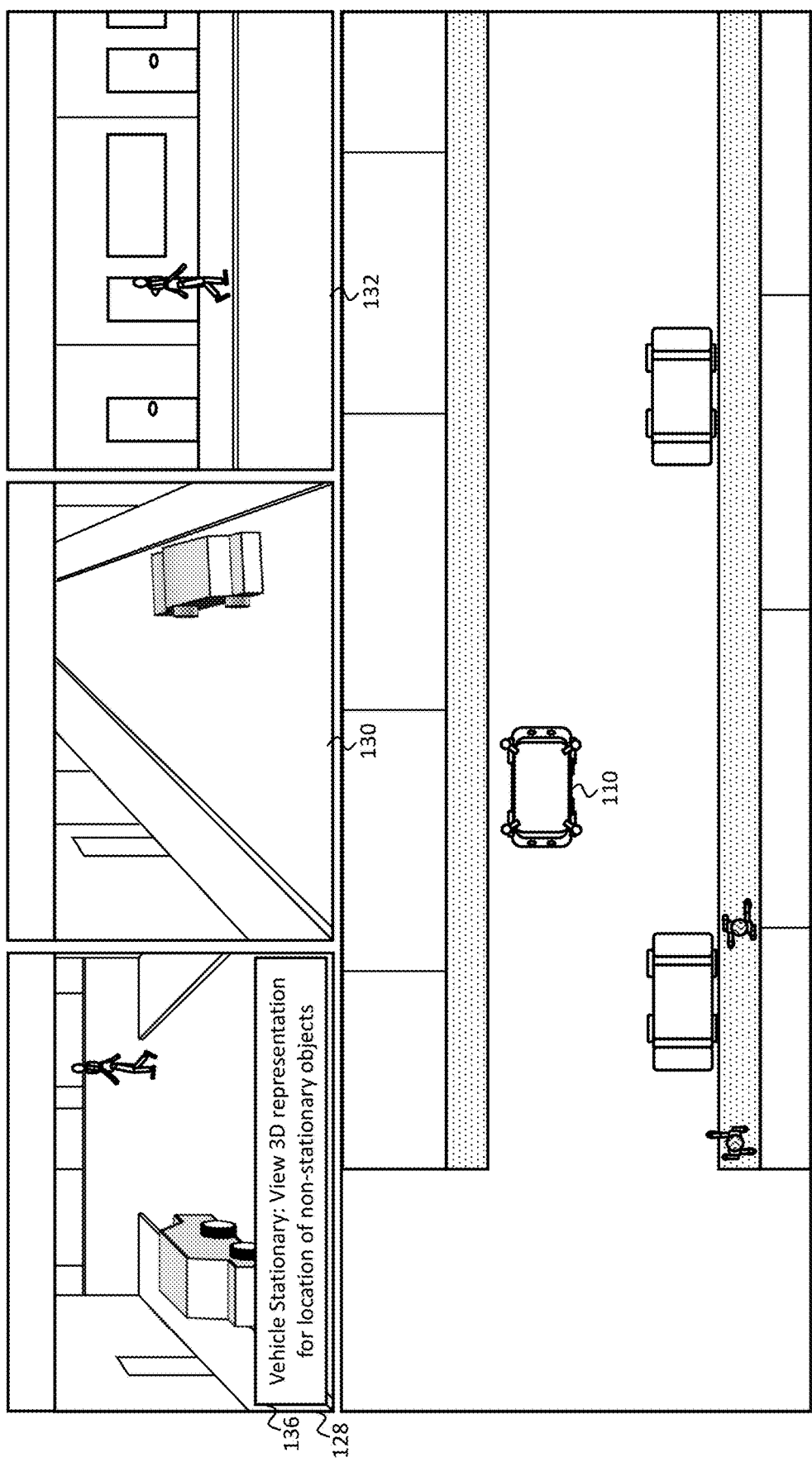

FIG. 10 corresponds to another view of the display of FIG. 9, but at a different time. In this scenario, the network conditions are such that a subsequent frame of video data has not been received by the system 100 for some time for at least one of the views. The video frame data may therefore be considered unreliable. As an example, the reliability metric for the first video frame data (shown in the first representation 128) at this moment in time may have been determined to have a value of 0.4.

In this scenario, the vehicle 110 may be stationary and there may be one or more non-stationary objects moving relative to the vehicle 110. For example, one or more pedestrians or vehicles may be moving relative to the vehicle 110. In such cases, it may be useful to indicate in the output on the display that the vehicle 110 is the same location as shown in the representation (so one or more stationary objects are in the same positions as shown), but one or more non-stationary objects may have moved relative to the vehicle 110. The displayed indication may inform the operator 118 that they should rely on the 3D representation 134 to determine the locations/positions of the non-stationary objects (assuming that the sensor data used to render the 3D representation 134 is still being received from the vehicle 110).

In some examples, when the additional data indicates that the vehicle 110 is stationary, and the display outputs a 3D representation 134 of the environment comprising one or more non-stationary objects, the output 106 may include one or more graphical indications 136 to indicate that at least one of: (i) the 3D representation 134 of the environment should be viewed to determine positions of the one or more non-stationary objects, or (ii) the representation 128 of the video frame data should be viewed to determine positions of one or more stationary objects. In one case, the one or more graphical indications 136 are positioned over (i.e., obscure), near to, or adjacent the representation 128 of the video frame data.

FIG. 10 therefore shows in the 3D representation 134 of the environment that the person has crossed the road, despite the first representation 128 of the video frame data still showing the person in the road.

It will be appreciated that this process may additionally or alternatively be applied to one or more of the other representations 130, 132 of the video frame data, and to examples where only one representation of video frame data is displayed. In some cases, the output is generated to additionally include a graphical item 122 based on the reliability metric and/or a representation 124 of the additional data, as described in earlier examples.

Figure 11:
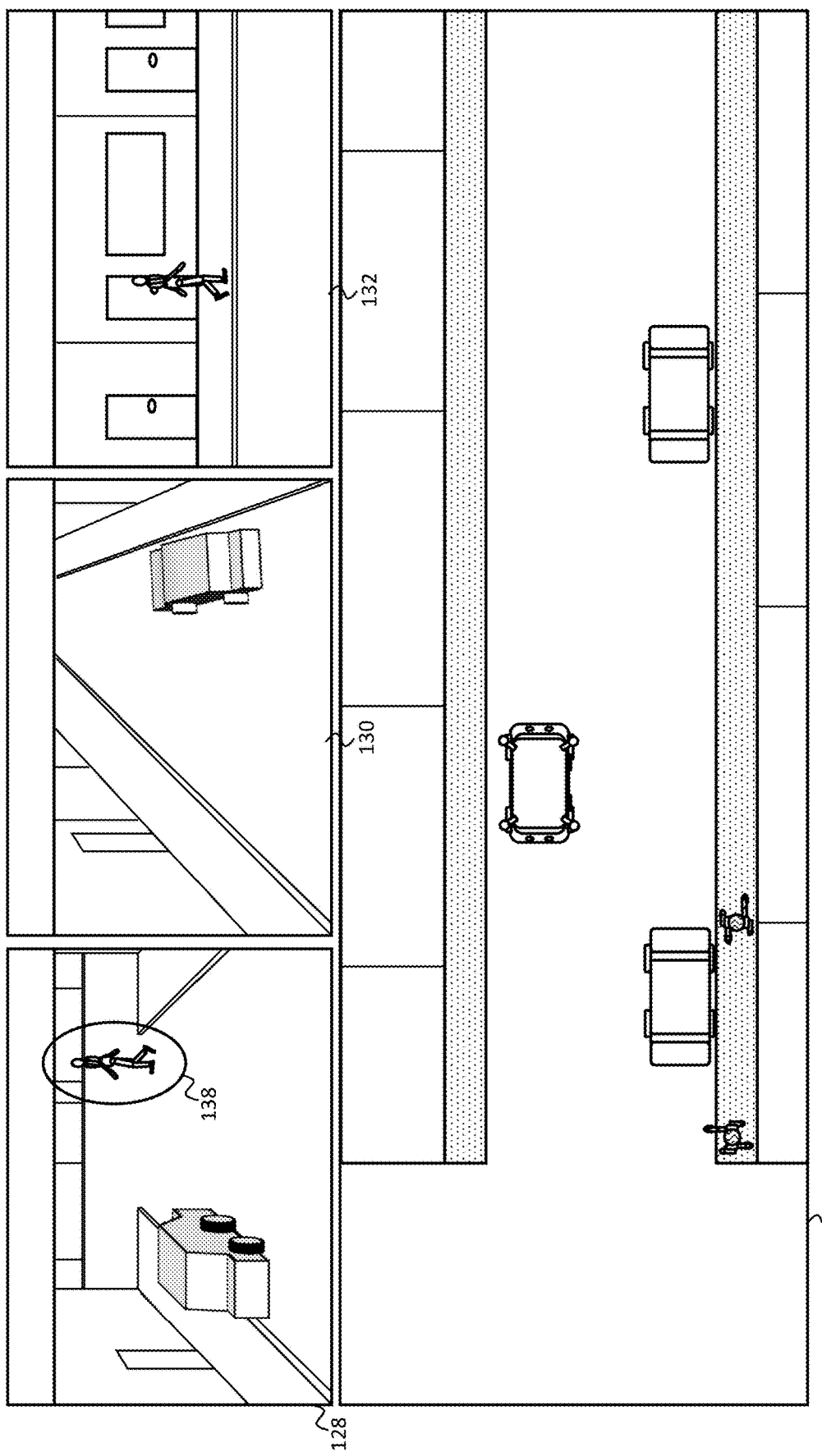

FIG. 11 corresponds to another view of the display of FIG. 9, but at a different time. In this scenario, the network conditions are such that a subsequent frame of video data has not been received by the system 100 for some time for at least one of the views. The video frame data may therefore be considered unreliable. As an example, the reliability metric for the first video frame data (shown in the first representation 128) at this moment in time may have been determined to have a value of 0.4.

In this scenario, there are one or more non-stationary objects moving relative to the vehicle 110. For example, one or more pedestrians or vehicles may be moving relative to the vehicle 110. In such cases, it may be useful to indicate in the representation 128 of the video frame data an area/region in the representation 128 of the video frame data that is unstable due to one or more non-stationary objects moving relative to the vehicle. For example, the positions of one or more non-stationary objects within the representation may be highlighted. The positions of one or more non-stationary objects within the representation 128 may be determined based on the additional data (such as the additional sensor data used to render the 3D representation 134). This can indicate to the operator 118 that this is a region of instability, so the operator 118 should be careful about navigating the vehicle 110 through this region.

In some examples, the output 106 may be generated to include, within the representation 128 of the video frame data, positions 138 of one or more non-stationary objects which may no longer be in the indicated positions. The indicated positions 138 may therefore be "old". In examples, a region of instability may additionally or alternatively be indicated based on a predicted trajectory or position of a non-stationary object. For example, based on the current velocity of the object, a predicted trajectory or predicted position may be determined for the object, and the predicted trajectory (such as a region into which the object may be predicted to move) may be indicated in the representation 128 or a predicted position (at a time in the future), may be indicated in the representation 128. As an example, another vehicle may be detected on the other side of the road, and the vehicle is determined to be heading towards the autonomous vehicle 110. A predicted trajectory for that vehicle might be the other lane, and so the representation 128 may be updated to indicate that the vehicle 110 should not cross into the other lane, because a vehicle may be there.

In another example, a region of instability may be indicated within the representation based on the detection of an object having a particular classification and/or state. For example, if the vehicle encounters a particular road sign, crosswalk or a traffic signal, a region within the environment, such as an intersection or the crosswalk, may be considered unstable. In some cases, the object, such as the traffic signal, is also highlighted/indicated in the representation 128.

It will be appreciated that this process may additionally or alternatively be applied to one or more of the other representations 130, 132 of the video frame data, and to examples where only one representation of video frame data is displayed. In some cases, the output additionally includes a graphical item 122 based on the reliability metric and/or a representation 124 of the additional data, as described in earlier examples.

Figure 12:
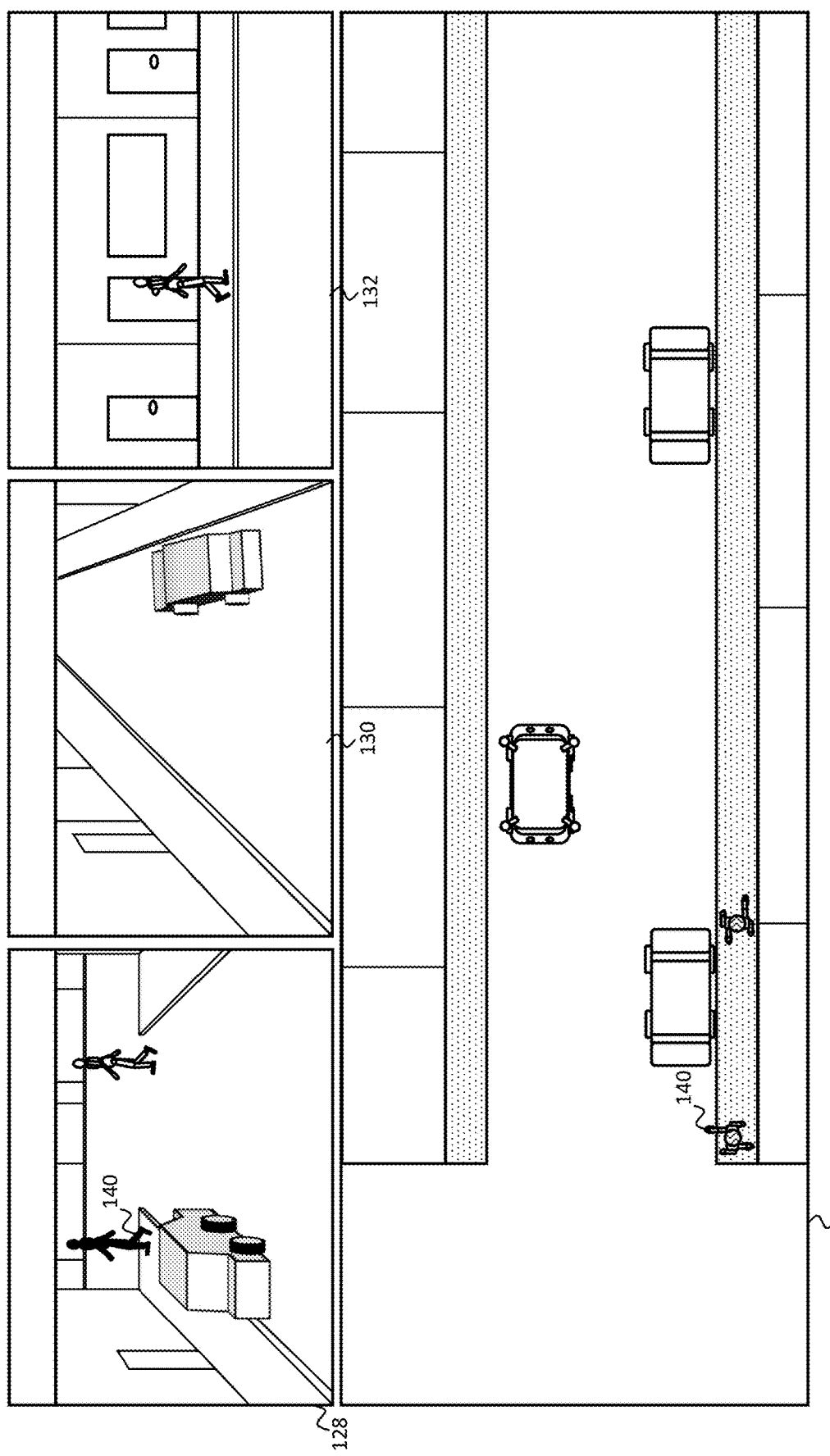

FIG. 12 corresponds to another view of the display of FIG. 9, but at a different time. In this scenario, the network conditions are such that a subsequent frame of video data has not been received by the system 100 for some time for at least one of the views. The video frame data may therefore be considered unreliable. As an example, the reliability metric for the first video frame data (shown in the first representation 128) at this moment in time may have been determined to have a value of 0.4.

In this scenario, there are one or more non-stationary objects moving relative to the vehicle 110. For example, one or more pedestrians or vehicles may be moving relative to the vehicle 110. In such cases, it may be useful to indicate in the representation 128 of the video frame data positions in the representation 128 of the video frame data of one or more non-stationary objects. For example, the positions of one or more non-stationary objects within the representation 128 may be updated as the non-stationary objects move. The indicated positions may be determined based on the additional data (such as the additional sensor data used to render the 3D representation 134. This can indicate to the operator 118 in a single representation where non-stationary objects are located.

In some examples, positions of one or more non-stationary objects may be determined based on the additional data and the output 106 may include within the representation 128 of the sensor data, positions of the one or more non-stationary objects. For example, a 3D model/render of a non-stationary object may be merged into the representation 128 of the video frame data, or more generally, a position of a non-stationary object may be shown in the representation 128 of the video frame data.

It will be appreciated that this process may additionally or alternatively be applied to one or more of the other representations 130, 132 of the video frame data, and to examples where only one representation of video frame data is displayed. In some cases, the output is generated to additionally include a graphical item 122 based on the reliability metric and/or a representation 124 of the additional data, as described in earlier examples.

FIG. 7 illustrates a flow chart of an example method 200. The example method 200 may be implemented by one or more components of the system 100. In examples, the method 200 may be encoded and stored as instructions on one or more non-transitory computer-readable media that, when executed by the one or more processors 102 of the system 100, cause the system 100 to implement the method 200. In examples, the method is a computer implemented method.

As can be seen in FIG. 7, the method/process 200 may comprise, at step 202, receiving, at the system 100, from an autonomous vehicle 110: sensor data, wherein the sensor data is indicative of an environment in which the vehicle 110 is currently located or was previously located. At step 204, the method may comprise causing a display 106 to output a representation 108 of the sensor data. At step 206, the method may comprise receiving or determining, at the system 100, additional data associated with at least one of: the sensor data, the vehicle 110, or the environment. At step 208, the method may comprise determining, based at least in part on the additional data, a reliability metric, the reliability metric being indicative of how reliable the sensor data is at representing the environment in which the vehicle 110 is located at a current time. At step 210, the method may comprise causing the output on the display 106 to be based at least in part on the reliability metric. As mentioned, the same process 200 may be repeated for additional sensor data that is separately represented on the display. For example, as discussed earlier, each video camera (or other sensors) may provide sensor data and be separately represented and displayed to the operator and also be associated with different reliability metrics.

As mentioned, in some examples, the sensor data may correspond to video data comprising video frame data. Step 202 may therefore comprise receiving, at the system 100, from an autonomous vehicle 110: video data comprising video frame data, wherein the video frame data is indicative of an environment in which the vehicle 110 is currently located or was previously located. At step 204, the method may comprise causing a display 106 to output a representation 108 of the video frame data. At step 206, the method may comprise receiving or determining, at the system 100, additional data associated with at least one of: the video frame data, the vehicle 110, or the environment, wherein the additional data is different from the video frame data. At step 208, the method may comprise determining, based at least in part on the additional data, a reliability metric, the reliability metric being indicative of how reliable the video frame data is at representing the environment in which the vehicle 110 is located at a current time. At step 210, the method may comprise causing the output on the display 106 to be based at least in part on the reliability metric.

As mentioned, the sensor data may be combined to form part of a displayed representation, where different portions or parts of the representation are associated with different reliability metrics. Accordingly, step 202 may therefore comprise receiving, at the system 100, from an autonomous vehicle 110: sensor data, wherein the sensor data comprises first sensor data indicative of a first part of the environment in which the vehicle 110 is currently located or was previously located and second sensor data indicative of a second part of the environment in which the vehicle 110 is currently located or was previously located. At step 204, the method may comprise causing a display 106 to output a representation 108 of the sensor data, the representation 108 comprising a first display area and a second display area, the first display area being based on the first sensor data, the second display area being based on the second sensor data. Each display area corresponds to a different area on the physical display viewed by an operator, but is part of the same representation. As an example, the representation may be the 3D representation 134 shown in FIG. 9. At step 206, the method may comprise receiving or determining, at the system 100, additional data associated with at least one of: the sensor data, the vehicle 110, or the environment. At step 208, the method may comprise determining, based at least in part on the additional data, a first reliability metric, the first reliability metric being indicative of how reliable the first sensor data is at representing the environment in which the vehicle 110 is located at a current time and a second reliability metric, the second reliability metric being indicative of how reliable the second sensor data is at representing the environment in which the vehicle 110 is located at the current time. At step 210, the method may comprise causing the output on the display 106 to be based at least in part on the reliability metric. For example, each display area may be adapted based on the corresponding reliability metric, as described above. For example, a graphical item 122 and/or representation 124 of the additional data may be displayed and associated with each display area.

Figure 14:
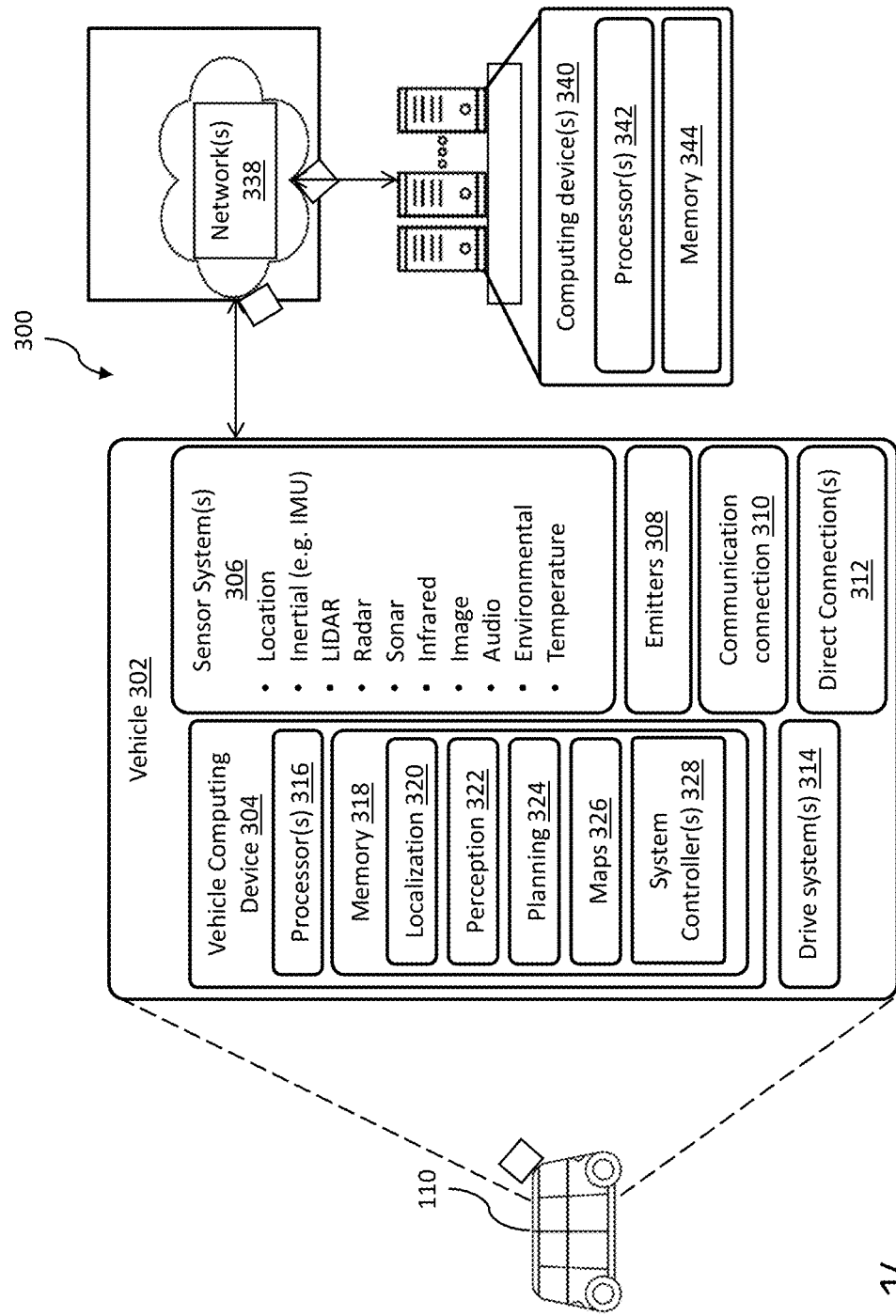
FIG. 14 is a block diagram of an example vehicle system.

FIG. 14 depicts a block diagram of an example system 300 for implementing the techniques described here. In some instances, the system 300 may include a vehicle 302, which may correspond to the vehicle 110 discussed in respect of FIG. 1. In some instances, the vehicle 110 may be a self-driving or autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 110 may be a fully or partially autonomous vehicle having any other level or classification. Moreover, in some instances, the techniques described herein may be usable by non-autonomous vehicles as well.

The vehicle 110 can include vehicle computing device(s) 304, one or more sensor systems 306 (corresponding to the one or more sensors 112 of FIG. 1, for example), one or more emitters 308, one or more communication connections 310, at least one direct connection 312 (e.g., for physically coupling the vehicle 110 to exchange data and/or to provide power), and one or more drive systems 314.

In some instances, the sensor(s) 306 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), drive system sensors for torque and/or velocity sensing etc. The sensor(s) 306 may include multiple instances of each of these or other types of sensors. For instance, the LIDAR sensors may include individual LIDAR sensors located at the corners, front, back, sides, and/or top of the vehicle 110. As another example, the cameras may include multiple cameras disposed at various locations about the exterior and/or interior of the vehicle 110. The sensor(s) 306 may provide input to the vehicle computing device(s) 304.

The vehicle 110 may also include the emitter(s) 308 for emitting light and/or sound. The emitter(s) 308 in this example may include interior audio and visual emitter(s) to communicate with passengers of the vehicle 110. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 308 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 110 may also include the communication connection(s) 310 that enable communication between the vehicle 110 and one or more other local or remote computing device(s). For instance, the communication connection(s) 310 may facilitate communication with other local computing device(s) on the vehicle 110 and/or the drive system(s)

314. Also, the communication connection(s) 310 may additionally or alternatively allow the vehicle 110 to communicate with other nearby computing device(s) (e.g., other nearby vehicles, traffic signals, etc.). The communication connection(s) 310 may additionally or alternatively enable the vehicle 110 to communicate with a computing device 340, which may be a remote computing device 340, such as a server. The one or more computing devices 340 may include the remote system 100 of FIG. 1, for example.

The vehicle computing device(s) 304 can include one or more processors 316 and memory 318 communicatively coupled with the one or more processors 316. In the illustrated example, the memory 318 of the vehicle computing device(s) 304 stores a localization component 320 perception component 322, a planning component 324, one or more maps 326, and one or more system controllers 328. Though depicted in FIG. 14 as residing in memory 318 for illustrative purposes, it is contemplated that the localization component 320, the perception component 322, the planning component 324, the one or more maps 326, and the one or more system controllers 328 may additionally, or alternatively, be accessible to the vehicle 110 (e.g., stored remotely).

In some instances, the localization component 320 may be configured to receive data from the sensor system(s) 306 to determine a position and/or orientation of the vehicle 110 (e.g., one or more of an x-, y-, z-position, roll, pitch, or yaw). For example, the localization component 320 may include and/or request/receive a map 326 of an environment and may continuously determine a location and/or orientation of the autonomous vehicle within the map 326.

In some instances, the perception component 322 can include functionality to perform object detection, segmentation, and/or classification. In some examples, the perception component 322 can provide processed sensor data that indicates a presence of an entity/object that is proximate to the vehicle 110 and/or a classification of the entity as an entity type (e.g., car, pedestrian, cyclist, animal, building, tree, road surface, curb, sidewalk, unknown, etc.). Entities may be stationary or non-stationary. In additional or alternative examples, the perception component 322 can provide processed sensor data that indicates one or more characteristics associated with a detected entity (e.g., a tracked object) and/or the environment in which the entity is positioned. In some examples, characteristics associated with an entity can include, but are not limited to, a position/location, an x-position (global and/or local position), a y-position (global and/or local position), a z-position (global and/or local position), an orientation (e.g., a roll, pitch, yaw), a distance to the object, an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a number of entities in the environment (such as a number of non-stationary objects), a time of day, a day of a week, a season, a weather condition, an indication of darkness/light, etc.

In some instances, the planning component 324 may determine a location of a user based on image data of an environment received from the user using, for example, bags of binary words with image-based features, artificial neural network, and the like. Further, the planning component 324 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 110 may stop to pick up a passenger. In at least one example, the planning component 324 may determine a pickup location based at least in part on determining a user identity (e.g., determined via image recognition or received as an indication from a user device, as discussed herein).

In some instances, the one or more maps 326 may be used by the vehicle 110 to navigate within the environment. For the purpose of this discussion, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 326 may be stored based on, for example, a characteristic (e.g., type of entity, time of day, day of week, season of the year, etc.). Storing multiple maps 326 may have similar memory requirements, but increase the speed at which data in a map may be accessed.

In at least one example, the vehicle computing device(s) 304 can include one or more system controllers 328. The system controller 328 can be configured to control steering, propulsion, braking, safety, emitters, communication, and other systems of the vehicle 110. The system controller(s) 328 can communicate with and/or control corresponding systems of the drive system(s) 314 and/or other components of the vehicle 110. The system controller(s) 328 may be communicatively coupled to one or more sensors of the vehicle sensor system(s) 306.

The drive system(s) 314 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 314 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 314. Furthermore, the drive system(s) 314 may also include one or more communication connection(s) that enable communication by the respective drive system with one or more other local or remote computing device(s).

Figure 13:
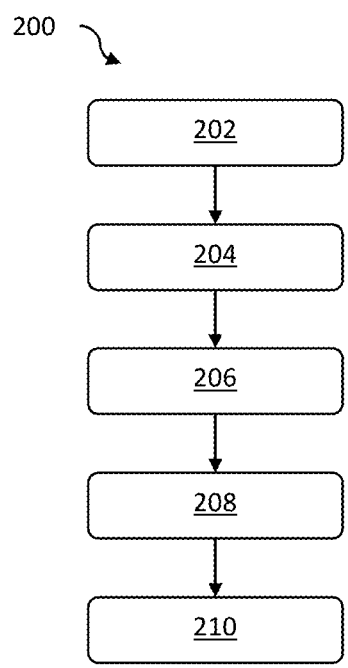
FIG. 13 depicts a flow chart of a method according to an example.

In some examples, the vehicle 110 can send data, including raw or processed sensor data from the sensor system(s) 306, to one or more computing device(s) 340 via the network(s) 338. The one or more computing device(s) 340 may comprise one or more processors 342 and memory 344. The one or more computing devices 340 may be remote from the vehicle. The one or more computing device(s) 340 may implement the method of FIG. 13.

In some instances, aspects of some or all of the components discussed herein may include any models, algorithms, and/or machine learning algorithms. For example, the component(s) in the memory 318, 344 may be implemented as a neural network. As can be understood in the context of this disclosure, a neural network can utilize machine learning, which can refer to a broad class of such algorithms in which an output is generated based on learned parameters.

Example Clauses

A. A system comprising:
one or more processors; and
one or more non-transitory computer readable media having instructions stored thereon which, when executed by the one or more processors, cause the one or more processors to perform operations comprising:
receiving, at the system, from an autonomous vehicle:
video data comprising video frame data, wherein the video frame data is indicative of an environment in which the vehicle is currently located or was previously located;
causing a display to output a representation of the video frame data;
receiving or determining, at the system, additional data associated with at least one of: the vehicle or the environment;
determining a time difference associated with the video frame data;
determining, based at least in part on the additional data and the time difference associated with the video frame data, a reliability metric, the reliability metric being indicative of how reliable the video frame data is at representing an environment in which the vehicle is located at a current time; and
causing the output on the display to be based at least in part on the reliability metric.

B. The system of clause A, wherein causing the output on the display to be based at least in part on the reliability metric comprises causing the display to output a graphical item, wherein the presence of and/or characteristics of the graphical item are based on the reliability metric.

C. The system of clause B, wherein the characteristics include at least one of: a form, size, color, position or opacity of the graphical item.

D. The system of any of clauses A-C, wherein determining the reliability metric comprises determining the reliability metric from a reliability metric scale comprising a plurality of reliability metrics including at least a minimum reliability metric and a maximum reliability metric, the maximum reliability metric indicating that the video frame data is more reliable at representing the environment in which the vehicle is located at the current time than the minimum reliability metric.

E. The system of clause D, wherein causing the output on the display to be based at least in part on the reliability metric comprises displaying, on the display, a graphical item, wherein the graphical item is based on the reliability metric, wherein a graphical item associated with the minimum reliability metric has a different form, size, color, position and/or opacity of the compared to a graphical item associated with the maximum reliability metric.

F. The system of any of clauses A-E, wherein the time difference is based on one of:
a time difference between a time at which the video frame data was recorded by the vehicle and the current time;
a time difference between a time at which the video frame data was sent by the vehicle and the current time;
a time difference between a time at which the video frame data was received by the system and the current time; or
a time difference between a time at which the representation of the video frame data was output by the display and the current time;
wherein a smaller time difference results in, or contributes to, a higher reliability metric and a greater time difference results in, or contributes to, a lower reliability metric; and
wherein a higher reliability metric indicates that the video frame data is more reliable at representing the environment in which the vehicle is located at the current time than a lower reliability metric.

G. The system of any of clauses A-F, wherein:
determining a time difference associated with the video frame data comprises:
receiving or determining data associated with the video frame data, wherein the data associated with the video frame data comprises a timestamp, wherein the timestamp is based on one of: a time at which the video frame data was recorded by the vehicle, or a time at which the video frame data was sent by the vehicle, or a time at which the video frame data was received by the system, or a time at which the representation of the video frame data was output by the display; and
determining the time difference based on the timestamp and the current time.

H. The system of any of clauses A-G, wherein data associated with the vehicle comprises at least one of:
a speed of the vehicle, wherein a lower speed results in, or contributes to, a higher reliability metric and a higher speed results in, or contributes to, a lower reliability metric, wherein a higher reliability metric indicates that the video frame data is more reliable at representing the environment in which the vehicle is located at the current time than a lower reliability metric;
a distance travelled by the vehicle, wherein a lower distance results in, or contributes to, a higher reliability metric and a higher distance results in, or contributes to, a lower reliability metric; or
a condition of one or more sensors of the vehicle, wherein a better condition results in, or contributes to, a higher reliability metric and a poorer condition results in, or contributes to, a lower reliability metric.

I. The system of any of clauses A-H, wherein data associated with the environment comprises at least one of:
a number of non-stationary objects in the environment, wherein a lower number of non-stationary objects results in, or contributes to, a higher reliability metric and a higher number of non-stationary objects results in, or contributes to, a lower reliability metric, wherein a higher reliability metric indicates that the video frame data is more reliable at representing the environment in which the vehicle is located at the current time than a lower reliability metric;
a distance between the vehicle and one or more non-stationary objects in the environment, wherein a greater distance between the vehicle and the one or more non-stationary objects in the environment results in, or contributes to, a higher reliability metric and a smaller distance between the vehicle and the one or more non-stationary objects in the environment results in, or contributes to, a lower reliability metric; or
a characteristic and/or state of one or more objects in the environment, wherein the characteristic and/or state of each object results in, or contributes to, a higher or lower reliability metric based on the object.

J. The system of any of clauses A-I, wherein the operations further comprise:
sending, to the vehicle, command data, wherein the command data comprises an instruction for the vehicle, wherein the vehicle implements the instruction based on one of: an indication of the reliability metric or a reliability of a network connection between the vehicle and the system.

K. The system of any of clauses A-J, wherein causing the output on the display to be based at least in part on the reliability metric, comprises at least one of:
causing the display to output a graphical item, wherein the graphical item is based on the reliability metric;
causing the display to output a representation of the additional data;
causing the display to cease the output of the representation of the video frame data; or
causing the display to dim the output of the representation of the video frame data.

L. The system of clause K, wherein causing the display to output a graphical item, comprises one of:
causing display to output the graphical item to obscure at least part of the representation of the video frame data; or
causing display to output the graphical item adjacent the representation of the video frame data.

M. The system of clause K or L, wherein the operations further comprise:
comparing the reliability metric to a threshold reliability metric and wherein the graphical item is based on the comparison.

N. The system of any of clauses A-M, wherein the additional data indicates that the vehicle is stationary, and the operations further comprise causing the display to output a 3D representation of the environment comprising one or more non-stationary objects;
wherein causing the output on the display to be based at least in part on the reliability metric comprises causing the display to display one or more graphical indications to indicate that at least one of: the 3D representation of the environment should be viewed to determine positions of the one or more non-stationary objects or the representation of the video frame data should be viewed to determine positions of one or more stationary objects.

O. The system of any of clauses A-N, wherein causing the output on the display to be based at least in part on the reliability metric comprises causing the display to indicate within the representation of the video frame data, at least one of: (i) positions of one or more non-stationary objects which may no longer be in the indicated positions, or (ii) predicted trajectories or predicted positions of the one or more non-stationary objects, or (iii) a region within the environment based on the detection of an object having a particular classification and/or state.

P. The system of any of clauses A-O, wherein the operations further comprise determining positions of one or more non-stationary objects based on the additional data and wherein causing the output on the display to be based at least in part on the reliability metric comprises causing the display to indicate within the representation of the video frame data, positions of the one or more non-stationary objects.

Q. The system of any of clauses A-P, wherein the additional data associated with the environment comprises historical video frame data associated with the environment, and wherein causing the output on the display to be based at least in part on the reliability metric comprises:
causing the display to cease the output of the representation of the video frame data and causing the display to output a representation of the historical video frame data, wherein the historical video frame data is indicative of the environment in which the vehicle is located at the current time.

R. A computer implemented method, comprising:
receiving from an autonomous vehicle:
sensor data, wherein the sensor data is indicative of an environment in which the vehicle is currently located or was previously located;
receiving or determining additional data associated with at least one of: the sensor data, the vehicle, or the environment;
displaying, on a display, an output comprising a representation of the sensor data;
determining, based at least in part on the additional data, a reliability metric, the reliability metric being indicative of how reliable the sensor data is at representing the environment in which the vehicle is located at a current time; and
causing the output on the display to be based at least in part on the reliability metric.

S. The method of clause R, wherein the sensor data comprises video data, the video data comprising video frame data.

T. The method of clause R or S, wherein the method further comprises determining a time difference associated with the sensor data, and wherein the reliability metric is determined based on the additional data and the time difference.

U. The method of any of clauses R-T, wherein causing the output on the display to be based at least in part on the reliability metric comprises causing the display to output a graphical item, wherein the presence of and/or characteristics of the graphical item are based on the reliability metric.

V. The method of clause U, wherein the characteristics include at least one of: a form, size, color, position or opacity of the graphical item.

W. The method of any of clauses R-V, wherein determining the reliability metric comprises determining the reliability metric from a reliability metric scale comprising a plurality of reliability metrics including at least a minimum reliability metric and a maximum reliability metric, the maximum reliability metric indicating that the sensor data is more reliable at representing the environment in which the vehicle is located at the current time than the minimum reliability metric.

X. The method of clause W, wherein causing the output on the display to be based at least in part on the reliability metric comprises displaying, on the display, a graphical item, wherein the graphical item is based on the reliability metric, wherein a graphical item associated with the minimum reliability metric has a different form, size, color, position and/or opacity of the compared to a graphical item associated with the maximum reliability metric.

Y. The method of any of clauses R-X, wherein the additional data comprises at least one of:
data associated with the vehicle, wherein the data associated with the vehicle comprises at least one of: a speed of the vehicle or a distance travelled by the vehicle or a location of the vehicle or a condition of one or more sensors of the vehicle; or data associated with the environment, wherein data associated with the environment comprises at least one of: data associated with a number of non-stationary objects in the environment or a distance between the vehicle and one or more non-stationary objects in the environment or a characteristic and/or state of one or more objects in the environment.

Z. The method of clause Y, wherein:
a lower speed results in, or contributes to, a higher reliability metric and a higher speed results in, or contributes to, a lower reliability metric, wherein a higher reliability metric indicates that the sensor data is more reliable at representing the environment in which the vehicle is located at the current time than a lower reliability metric;
a lower distance results in, or contributes to, a higher reliability metric and a higher distance results in, or contributes to, a lower reliability metric;
wherein the characteristic and/or state of each object results in, or contributes to, a higher or lower reliability metric based on the object;
a lower number of non-stationary objects results in, or contributes to, a higher reliability metric and a higher number of non-stationary objects results in, or contributes to, a lower reliability metric;
a greater distance between the vehicle and the one or more non-stationary objects in the environment results in, or contributes to, a higher reliability metric and a smaller distance between the vehicle and the one or more non-stationary objects in the environment results in, or contributes to, a lower reliability metric; or
wherein a better condition results in, or contributes to, a higher reliability metric and a poorer condition results in, or contributes to, a lower reliability metric.

AA. The method of any of clauses R-Z, wherein:
data associated with the sensor data comprises a timestamp, wherein the timestamp is based on one of: a time at which the sensor data was recorded by the vehicle, or a time at which the sensor data was sent by the vehicle, or a time at which the sensor data was received, or a time at which the representation of the sensor data was output by the display;
the method further comprises determining, based on the timestamp and the current time, a time difference associated with the sensor data; and
wherein determining, based on the additional data, the reliability metric, comprises determining the reliability metric based on the time difference.

AB. The method of clause of AA, wherein a smaller time difference results in, or contributes to, a higher reliability metric and a greater time difference results in, or contributes to, a lower reliability metric; and
wherein a higher reliability metric indicates that the sensor data is more reliable at representing the environment in which the vehicle is located at the current time than a lower reliability metric.

AC. The method of any of clauses R-AB, further comprising:
sending, to the vehicle, command data, wherein the command data comprises an instruction for the vehicle, wherein the vehicle implements the instruction based on one of: the reliability metric or a reliability of a network connection.

AD. The method of any of clauses R-AC, wherein causing the output on the display to be based at least in part on the reliability metric, comprises at least one of:
causing the display to output a graphical item, wherein the graphical item is based on the reliability metric;
causing the display to output a representation of the additional data;
causing the display to cease the output of the representation of the sensor data; or
causing the display to dim the output of the representation of the sensor data.

AE. The method of clause AD, wherein causing the display to output a graphical item, comprises one of:
causing display to output the graphical item to obscure at least part of the representation of the sensor data; or
causing display to output the graphical item adjacent the representation of the sensor data.

AF. The method of clause AD or AE, wherein the operations further comprise:
comparing the reliability metric to a threshold reliability metric and wherein the graphical item is based on the comparison.

AG. The method of any of clauses R-AF, wherein the additional data indicates that the vehicle is stationary, and the method further comprises causing the display to output a 3D representation of the environment comprising one or more non-stationary objects;
wherein causing the output on the display to be based at least in part on the reliability metric comprises causing the display to display one or more graphical indications to indicate that at least one of: the 3D representation of the environment should be viewed to determine positions of the one or more non-stationary objects or the representation of the sensor data should be viewed to determine positions of one or more stationary objects.

AH. The method of any of clauses R-AG, wherein causing the output on the display to be based at least in part on the reliability metric comprises causing the display to indicate within the representation of the sensor data, at least one of: (i) positions of one or more non-stationary objects which may no longer be in the indicated positions, or (ii) predicted trajectories or predicted positions of the one or more non-stationary objects, or (iii) a region within the environment based on the detection of an object having a particular classification and/or state.

AI. The method of any of clauses R-AH, wherein the method further comprises determining positions of one or more non-stationary objects based on the additional data and wherein causing the output on the display to be based at least in part on the reliability metric comprises causing the display to indicate within the representation of the sensor data, positions of the one or more non-stationary objects.

AJ. The method of any of clauses R-AI, wherein the additional data associated with the environment comprises historical sensor data associated with the environment, and wherein causing the output on the display to be based at least in part on the reliability metric comprises:
causing the display to cease the output of the representation of the sensor data and causing the display to output a representation of the historical sensor data, wherein the historical sensor data is indicative of the environment in which the vehicle is located at the current time.

AK. One or more non-transitory computer-readable media storing instructions that, when executed by one or more processors of a system, cause the system to perform operations comprising:

receiving, at the system, from an autonomous vehicle:
  sensor data, wherein the sensor data is indicative of an environment in which the vehicle is currently located or was previously located;
  causing a display to output a representation of the sensor data;
  receiving or determining, at the system, additional data associated with at least one of: the sensor data, the vehicle, or the environment;
  determining, based at least in part on the additional data, a reliability metric, the reliability metric being indicative of how reliable the sensor data is at representing the environment in which the vehicle is located at a current time; and
  causing the output on the display to be based at least in part on the reliability metric.

AL. The one or more non-transitory computer-readable media of clause AK, wherein the sensor data comprises video data, the video data comprising video frame data.

AM. The one or more non-transitory computer-readable media of any of clauses AK-AL, wherein the operations further comprise determining a time difference associated with the sensor data, and wherein the reliability metric is determined based on the additional data and the time difference.

AN. The one or more non-transitory computer-readable media of clause AM, wherein the time difference is based on one of:
  a time difference between a time at which the sensor data was recorded by the vehicle and the current time;
  a time difference between a time at which the sensor data was sent by the vehicle and the current time;
  a time difference between a time at which the sensor data was received by the system and the current time; or
  a time difference between a time at which the representation of the sensor data was output by the display and the current time;
  wherein a smaller time difference results in, or contributes to, a higher reliability metric and a greater time difference results in, or contributes to, a lower reliability metric; and
  wherein a higher reliability metric indicates that the sensor data is more reliable at representing the environment in which the vehicle is located at the current time than a lower reliability metric.

AO. The one or more non-transitory computer-readable media of any of clauses AK-AN, wherein causing the output on the display to be based at least in part on the reliability metric, comprises at least one of:
  causing the display to output a graphical item, wherein the graphical item is based on the reliability metric;
  causing the display to output a representation of the additional data;
  causing the display to cease the output of the representation of the sensor data; or
  causing the display to dim the output of the representation of the sensor data.

AP. The one or more non-transitory computer-readable media of clause AO, wherein the presence of and/or characteristics of the graphical item are based on the reliability metric.

AQ. The one or more non-transitory computer-readable media of clause AP, wherein the characteristics include at least one of: a form, size, color, position or opacity of the graphical item.

AR. The one or more non-transitory computer-readable media of any of clauses AO-AQ, wherein causing the display to output a graphical item, comprises one of:
  causing display to output the graphical item to obscure at least part of the representation of the sensor data; or
  causing display to output the graphical item adjacent the representation of the sensor data.

AS. The one or more non-transitory computer-readable media of any of clauses AI-AR, wherein the operations further comprise:
  comparing the reliability metric to a threshold reliability metric and wherein the graphical item is based on the comparison.

AT. The one or more non-transitory computer-readable media of any of clauses AK-AS, wherein the additional data indicates that the vehicle is stationary, and the operations further comprise causing the display to output a 3D representation of the environment comprising one or more non-stationary objects;
  wherein causing the output on the display to be based at least in part on the reliability metric comprises causing the display to display one or more graphical indications to indicate that at least one of: the 3D representation of the environment should be viewed to determine positions of the one or more non-stationary objects or the representation of the sensor data should be viewed to determine positions of one or more stationary objects.

AU. The one or more non-transitory computer-readable media of any of clauses AK-AT, wherein causing the output on the display to be based at least in part on the reliability metric comprises causing the display to indicate within the representation of the sensor data, at least one of: (i) positions of one or more non-stationary objects which may no longer be in the indicated positions, or (ii) predicted trajectories or predicted positions of the one or more non-stationary objects, or (iii) a region within the environment based on the detection of an object having a particular classification and/or state.

AV. The one or more non-transitory computer-readable media of any of clauses AK-AU, wherein the operations further comprise determining positions of one or more non-stationary objects based on the additional data and wherein causing the output on the display to be based at least in part on the reliability metric comprises causing the display to indicate within the representation of the sensor data, positions of the one or more non-stationary objects.

AW. The one or more non-transitory computer-readable media of any of clauses AK-AV, wherein the additional data associated with the environment comprises historical sensor data associated with the environment, and wherein causing the output on the display to be based at least in part on the reliability metric comprises:
  causing the display to cease the output of the representation of the sensor data and causing the display to output a representation of the historical sensor data, wherein the historical sensor data is indicative of the environment in which the vehicle is located at the current time.

AX. The one or more non-transitory computer-readable media of any of clauses AK-AW, wherein determining the reliability metric comprises determining the reliability metric from a reliability metric scale comprising a plurality of reliability metrics including at least a minimum reliability metric and a maximum reliability metric, the maximum reliability metric indicating that the sensor data is more reliable at representing the environment in which the vehicle is located at the current time than the minimum reliability metric.

AY. The one or more non-transitory computer-readable media of clause AX, wherein causing the output on the display to be based at least in part on the reliability metric comprises displaying, on the display, a graphical item, wherein the graphical item is based on the reliability metric, wherein a graphical item associated with the minimum reliability metric has a different form, size, color, position and/or opacity of the compared to a graphical item associated with the maximum reliability metric.

AZ. The one or more non-transitory computer-readable media of any of clauses AK-AY, wherein the additional data comprises at least one of:
  data associated with the vehicle, wherein the data associated with the vehicle comprises at least one of: a speed of the vehicle or a distance travelled by the vehicle or a location of the vehicle or a condition of one or more sensors of the vehicle; or
  data associated with the environment, wherein data associated with the environment comprises at least one of: data associated with a number of non-stationary objects in the environment or a distance between the vehicle and one or more non-stationary objects in the environment or a characteristic and/or state of one or more objects in the environment.

BA. The one or more non-transitory computer-readable media of clause AZ, wherein:
  a lower speed results in, or contributes to, a higher reliability metric and a higher speed results in, or contributes to, a lower reliability metric, wherein a higher reliability metric indicates that the sensor data is more reliable at representing the environment in which the vehicle is located at the current time than a lower reliability metric;
  wherein a lower distance results in, or contributes to, a higher reliability metric and a higher distance results in, or contributes to, a lower reliability metric;
  wherein the characteristic and/or state of each object results in, or contributes to, a higher or lower reliability metric based on the object;
  wherein a lower number of non-stationary objects results in, or contributes to, a higher reliability metric and a higher number of non-stationary objects results in, or contributes to, a lower reliability metric;
  wherein a greater distance between the vehicle and the one or more non-stationary objects in the environment results in, or contributes to, a higher reliability metric and a smaller distance between the vehicle and the one or more non-stationary objects in the environment results in, or contributes to, a lower reliability metric; or
  wherein a better condition results in, or contributes to, a higher reliability metric and a poorer condition results in, or contributes to, a lower reliability metric.

BB. The one or more non-transitory computer-readable media of any of clauses AK-BA, wherein:
  data associated with the sensor data comprises a timestamp, wherein the timestamp is based on one of: a time at which the sensor data was recorded by the vehicle, or a time at which the sensor data was sent by the vehicle, or a time at which the sensor data was received by the system, or a time at which the representation of the sensor data was output by the display;
  the operations further comprise determining, based on the timestamp and the current time, a time difference associated with the sensor data; and
  wherein determining, based on the additional data, the reliability metric, comprises determining the reliability metric based on the time difference.

BC. The one or more non-transitory computer-readable media of clause BB, wherein a smaller time difference results in, or contributes to, a higher reliability metric and a greater time difference results in, or contributes to, a lower reliability metric; and
  wherein a higher reliability metric indicates that the sensor data is more reliable at representing the environment in which the vehicle is located at the current time than a lower reliability metric.

BD. The one or more non-transitory computer-readable media of any of clauses AK-BC, further comprising:
  sending, to the vehicle, command data, wherein the command data comprises an instruction for the vehicle, wherein the vehicle implements the instruction based on one of: the reliability metric or a reliability of a network connection.

BE. A system comprising: (A) one or more processors, and (B) one or more non-transitory computer readable media having instructions stored thereon which, when executed by the one or more processors, cause the one or more processors to perform operations comprising: (i) receiving, at the system, from an autonomous vehicle, video data comprising video frame data, wherein the video frame data is indicative of an environment in which the vehicle is currently located or was previously located, (ii) causing a display to output a representation of the video frame data, (iii) receiving or determining, at the system, additional data associated with at least one of: the video frame data, the vehicle or the environment, (iv) determining, based at least in part on the additional data, a reliability metric, the reliability metric being indicative of how reliable the video frame data is at representing an environment in which the vehicle is located at a current time, and (v) causing the output on the display to be based at least in part on the reliability metric.

BF. A system comprising: (A) one or more processors, and (B) one or more computer readable media having instructions stored thereon which, when executed by the one or more processors, cause the one or more processors to perform the operation of clauses R-AJ.

While the example clauses described above are described with respect to one particular implementation, it should be understood that, in the context of this document, the content of the example clauses can also be implemented via a method, device, system, computer-readable medium, and/or another implementation. Additionally, any of example clauses 1-BF may be implemented alone or in combination with any other one or more of the example clauses.

What is claimed is:
1. A system comprising:
  one or more processors; and
  one or more non-transitory computer readable media having instructions stored thereon which, when executed by the one or more processors, cause the one or more processors to perform operations comprising:
    receiving, at the system, from an autonomous vehicle remote from the system:
      video data comprising video frame data, wherein the video frame data is indicative of an environment in which the vehicle is currently located or was previously located;

causing a display associated with a remote operator to output a representation of the video frame data;

receiving or determining, at the system, additional data associated with at least one of the vehicle or the environment;

determining a time difference associated with transmission of the video frame data from the autonomous vehicle to the system;

determining, based at least in part on the additional data and the time difference associated with the video frame data, a reliability metric, the reliability metric being indicative of how reliable the video frame data is at representing an environment in which the vehicle is located at a current time; and causing the output on the display to be based at least in part on the reliability metric.

2. The system of claim 1, wherein causing the output on the display to be based at least in part on the reliability metric comprises causing the display to output a graphical item, wherein the presence of and/or characteristics of the graphical item are based on the reliability metric.

3. The system of claim 2, wherein the characteristics include at least one of: a form, size, color, position or opacity of the graphical item.

4. The system of claim 1, wherein the time difference is based on one of:

a time difference between a time at which the video frame data was recorded by the vehicle and the current time;

a time difference between a time at which the video frame data was sent by the vehicle and the current time;

a time difference between a time at which the video frame data was received by the system and the current time; or a time difference between a time at which the representation of the video frame data was output by the display and the current time;

wherein a smaller time difference results in, or contributes to, a higher reliability metric and a greater time difference results in, or contributes to, a lower reliability metric; and wherein a higher reliability metric indicates that the video frame data is more reliable at representing the environment in which the vehicle is located at the current time than a lower reliability metric.

5. The system of claim 1, wherein data associated with the vehicle comprises at least one of:

a speed of the vehicle, wherein a lower speed results in, or contributes to, a higher reliability metric and a higher speed results in, or contributes to, a lower reliability metric, wherein a higher reliability metric indicates that the video frame data is more reliable at representing the environment in which the vehicle is located at the current time than a lower reliability metric;

a distance travelled by the vehicle, wherein a lower distance results in, or contributes to, a higher reliability metric and a higher distance results in, or contributes to, a lower reliability metric; or a condition of one or more sensors of the vehicle, wherein a better condition results in, or contributes to, a higher reliability metric and a poorer condition results in, or contributes to, a lower reliability metric.

6. The system of claim 1, wherein data associated with the environment comprises at least one of:

a number of non-stationary objects in the environment, wherein a lower number of non-stationary objects results in, or contributes to, a higher reliability metric and a higher number of non-stationary objects results in, or contributes to, a lower reliability metric, wherein a higher reliability metric indicates that the video frame data is more reliable at representing the environment in which the vehicle is located at the current time than a lower reliability metric;

a distance between the vehicle and one or more non-stationary objects in the environment, wherein a greater distance between the vehicle and the one or more non-stationary objects in the environment results in, or contributes to, a higher reliability metric and a smaller distance between the vehicle and the one or more non-stationary objects in the environment results in, or contributes to, a lower reliability metric; or a characteristic and/or state of one or more objects in the environment, wherein the characteristic and/or state of each object results in, or contributes to, a higher or lower reliability metric based on the object.

7. A computer implemented method, comprising:

receiving, at a system, from an autonomous vehicle remote from the system:

sensor data, wherein the sensor data is indicative of an environment in which the vehicle is currently located or was previously located;

receiving or determining additional data associated with at least one of: the sensor data, the vehicle, or the environment;

displaying, on a display, an output comprising a representation of the sensor data;

determining, based at least in part on the additional data, a reliability metric, the reliability metric being indicative of how reliable the sensor data is at representing the environment in which the vehicle is located at a current time; and causing the output on the display to be based at least in part on the reliability metric.

8. The method of claim 7, wherein determining the reliability metric comprises determining the reliability metric from a reliability metric scale comprising a plurality of reliability metrics including at least a minimum reliability metric and a maximum reliability metric, the maximum reliability metric indicating that the sensor data is more reliable at representing the environment in which the vehicle is located at the current time than the minimum reliability metric.

9. The method of claim 8, wherein causing the output on the display to be based at least in part on the reliability metric comprises displaying, on the display, a graphical item, wherein the graphical item is based on the reliability metric, wherein a graphical item associated with the minimum reliability metric has a different form, size, color, position and/or opacity compared to a graphical item associated with the maximum reliability metric.

10. The method of claim 7, wherein the additional data comprises at least one of:

data associated with the vehicle, wherein the data associated with the vehicle comprises at least one of: a speed of the vehicle or a distance travelled by the vehicle or a location of the vehicle or a condition of one or more sensors of the vehicle; or data associated with the environment, wherein data associated with the environment comprises at least one of: data associated with a number of non-stationary objects in the environment or a distance between the vehicle and one or more non-stationary objects in the environment, or a characteristic and/or state of one or more objects in the environment.

11. The method of claim 7, wherein:
data associated with the sensor data comprises a timestamp, wherein the timestamp is based on one of: a time at which the sensor data was recorded by the vehicle, or a time at which the sensor data was sent by the vehicle, or a time at which the sensor data was received, or a time at which the representation of the sensor data was output by the display;
the method further comprises determining, based on the timestamp and the current time, a time difference associated with the sensor data; and
wherein determining, based on the additional data, the reliability metric, comprises determining the reliability metric based on the time difference.

12. The method of claim 7, further comprising:
sending, to the vehicle, command data, wherein the command data comprises an instruction for the vehicle, wherein the vehicle implements the instruction based on one of: the reliability metric or a reliability of a network connection.

13. One or more non-transitory computer-readable media storing instructions that, when executed by one or more processors of a system, cause the system to perform operations comprising:
receiving, at the system, from an autonomous vehicle remote from the system:
sensor data, wherein the sensor data is indicative of an environment in which the vehicle is currently located or was previously located;
causing a display to output a representation of the sensor data;
receiving or determining, at the system, additional data associated with at least one of: the sensor data, the vehicle, or the environment;
determining, based at least in part on the additional data, a reliability metric, the reliability metric being indicative of how reliable the sensor data is at representing the environment in which the vehicle is located at a current time; and
causing the output on the display to be based at least in part on the reliability metric.

14. The one or more non-transitory computer-readable media of claim 13, wherein causing the output on the display to be based at least in part on the reliability metric, comprises at least one of:
causing the display to output a graphical item, wherein the graphical item is based on the reliability metric;
causing the display to output a representation of the additional data;
causing the display to cease the output of the representation of the sensor data; or
causing the display to dim the output of the representation of the sensor data.

15. The one or more non-transitory computer-readable media of claim 14, wherein causing the display to output a graphical item, comprises one of:
causing display to output the graphical item to obscure at least part of the representation of the sensor data; or
causing display to output the graphical item adjacent the representation of the sensor data.

16. The one or more non-transitory computer-readable media of claim 14, wherein the operations further comprise:
comparing the reliability metric to a threshold reliability metric and wherein the graphical item is based on the comparison.

17. The one or more non-transitory computer-readable media of claim 13, wherein the additional data indicates that the vehicle is stationary, and the operations further comprise causing the display to output a 3D representation of the environment comprising one or more non-stationary objects;
wherein causing the output on the display to be based at least in part on the reliability metric comprises causing the display to display one or more graphical indications to indicate that at least one of: the 3D representation of the environment should be viewed to determine positions of the one or more non-stationary objects or the representation of the sensor data should be viewed to determine positions of one or more stationary objects.

18. The one or more non-transitory computer-readable media of claim 13, wherein causing the output on the display to be based at least in part on the reliability metric comprises causing the display to indicate within the representation of the sensor data, at least one of: (i) positions of one or more non-stationary objects which may no longer be in the indicated positions, or (ii) predicted trajectories or predicted positions of the one or more non-stationary objects, or (iii) a region within the environment based on detection of an object having a particular classification and/or state.

19. The one or more non-transitory computer-readable media of claim 13, wherein the operations further comprise determining positions of one or more non-stationary objects based on the additional data and wherein causing the output on the display to be based at least in part on the reliability metric comprises causing the display to indicate within the representation of the sensor data, positions of the one or more non-stationary objects.

20. The one or more non-transitory computer-readable media of claim 13, wherein the additional data associated with the environment comprises historical sensor data associated with the environment, and wherein causing the output on the display to be based at least in part on the reliability metric comprises:
causing the display to cease the output of the representation of the sensor data and causing the display to output a representation of the historical sensor data, wherein the historical sensor data is indicative of the environment in which the vehicle is located at the current time.

* * * * *